(12) United States Patent
Liu

(10) Patent No.: US 8,189,150 B2
(45) Date of Patent: May 29, 2012

(54) LIQUID CRYSTAL DISPLAY PANEL

(75) Inventor: Yui-Chen Liu, Taipei (TW)

(73) Assignee: Chungwa Picture Tubes, Ltd., Taoyuan (TW)

(*) Notice: Subject to any disclaimer, the term of this patent is extended or adjusted under 35 U.S.C. 154(b) by 544 days.

(21) Appl. No.: 12/410,467

(22) Filed: Mar. 25, 2009

(65) Prior Publication Data
US 2010/0141882 A1  Jun. 10, 2010

(30) Foreign Application Priority Data

Dec. 8, 2008  (TW) ............................. 97147696 A

(51) Int. Cl.
*G02F 1/1337* (2006.01)
(52) U.S. Cl. ........................................ 349/128; 349/129
(58) Field of Classification Search ................... 349/128, 349/129
See application file for complete search history.

(56) References Cited

U.S. PATENT DOCUMENTS 7,106,405 B2 * 9/2006 Okumura ...................... 349/129
7,466,384 B2 * 12/2008 Li .................................. 349/129
7,589,813 B2 * 9/2009 Chen et al. .................... 349/129
2007/0195246 A1 * 8/2007 Huang .......................... 349/129
2007/0290974 A1   12/2007 Huang et al.
2008/0024704 A1 * 1/2008 Huang .......................... 349/123

FOREIGN PATENT DOCUMENTS
CN  101216628  7/2008

OTHER PUBLICATIONS

"First Office Action of China Counterpart Application", issued on Dec. 18, 2009, p1-p3, in which the listed reference was cited.

* cited by examiner

*Primary Examiner* — Sarah Hahm
(74) *Attorney, Agent, or Firm* — Jianq Chyun IP Office

(57) ABSTRACT

A liquid crystal display panel including a first substrate, a second substrate and a liquid crystal layer is provided. The first substrate includes a plurality of first unit regions, and each of the first unit regions includes at least a pixel region. A plurality of first alignment patterns are disposed in each of the pixel regions, wherein a width of the first alignment patterns in at least one first unit region is different from a width of the first alignment patterns in other first unit regions adjacent to the at least one first unit region. The second substrate is disposed opposite to the first substrate. The liquid crystal layer is disposed between the first substrate and the second substrate.

15 Claims, 23 Drawing Sheets

LIQUID CRYSTAL DISPLAY PANEL

CROSS-REFERENCE TO RELATED APPLICATION

This application claims the priority benefit of Taiwan application serial no. 97147696, filed on Dec. 8, 2008. The entirety of the above-mentioned patent application is hereby incorporated by reference herein and made a part of specification.

BACKGROUND OF THE INVENTION

1. Field of the Invention

The present invention relates to a liquid crystal display panel and more particularly to a liquid crystal display panel having alignment patterns.

2. Description of Related Art

The rapid development of multimedia society is largely attributed to the progress of semiconductor devices or display apparatuses. Among various kinds of display panels, liquid crystal displays (LCD) having the advantages of high display quality, favorable space utilization, low power consumption, and non-radiation have gradually become the mainstream in the market.

Generally speaking, a liquid crystal display panel includes an active device array substrate, a color filter substrate, and a liquid crystal layer. In a multi-domain vertically alignment (MVA) liquid crystal display panel, the color filter substrate or the active device array substrate further includes alignment protrusions or alignment slits, such that liquid crystal molecules in different domains may tilt in different angles to achieve wide viewing feature.

As liquid crystal display panels are developed to have larger sizes, the sizes of the panels become larger than the photomask. As a consequence, adjoined photomasks are required when performing an exposure process for fabricating liquid crystal display panels. That is, the adjoined photomasks are moved by step to expose a plurality of exposure regions on the substrate, so as to transfer the patterns of the photomasks onto the whole substrate. However, due to discrepant exposures or low adjoining precision of photomasks, patterns formed at the junctions of two neighboring exposure regions may have different sizes or overlap each other. As a consequence, a narrow band-like region which has brightness obviously different from the two sides thereof may be formed in the display panel. In the liquid crystal display panel, the brightness on two sides of the narrow band-like region is actually similar. However, because two sides are separated by the narrow band-like region, the brightness of two sides seems tremendously different to the viewer's eyes. For this reason, the viewing quality of the liquid crystal display panel is low. The aforementioned situations become even more obvious when adjoined photomasks are used to form alignment protrusions of the color filter substrate, with a result that the viewing quality is lower.

SUMMARY OF THE INVENTION

The present invention provides a liquid crystal display panel for solving various problems that occur when an adjoined photomask is used to perform an exposure process during the fabrication of a large-sized liquid crystal display panel.

The present invention provides a liquid crystal display panel including a first substrate, a second substrate, and a liquid crystal layer. The first substrate includes a plurality of first unit regions, and each of the first unit regions includes at least a pixel region. Further, a plurality of first alignment patterns are disposed in each of the pixel regions, wherein a width of the first alignment patterns in at least one first unit region is different from a width of the first alignment patterns in other first unit regions close to the at least one first unit region. The second substrate is disposed opposite to the first substrate. The liquid crystal layer is disposed between the first substrate and the second substrate.

According to one embodiment of the present invention, the at least one first unit region is adjacent to the other first unit regions close to the at least one first unit region.

According to one embodiment of the present invention, in each of the pixel regions, a width of a portion of the first alignment patterns is different from a width of another portion of the first alignment patterns.

According to one embodiment of the present invention, a width difference between the first alignment patterns with different widths is between 0.3 and 1 micrometer.

According to one embodiment of the present invention, the second substrate includes a plurality of second unit regions, and each of the second unit regions includes at least a cell region, wherein each of the cell regions is disposed corresponding to one pixel region of the first unit regions.

According to one embodiment of the present invention, a plurality of second alignment patterns are disposed in each of the cell regions, and a width of the second alignment patterns in at least one second unit region is different from a width of the second alignment patterns in other second unit regions close to the at least one second unit region.

According to one embodiment of the present invention, the at least one second unit region is adjacent to the other second unit regions close to the at least one second unit region.

According to one embodiment of the present invention, in each of the cell regions, a width of a portion of the second alignment patterns is different from a width of another portion of the second alignment patterns.

The present invention further provides a liquid crystal display panel including a first substrate, a second substrate, and a liquid crystal layer. The first substrate includes a plurality of first unit regions, and each of the first unit regions includes at least a pixel region. Further, a plurality of first alignment patterns are disposed in each of the pixel regions, wherein at least one first unit region has a first positional shift relative to other first unit regions close to the at least one first unit region. The second substrate is disposed opposite to the first substrate. The liquid crystal layer is disposed between the first substrate and the second substrate.

According to one embodiment of the present invention, the at least one first unit region is adjacent to the other first unit regions close to the at least one first unit region.

According to one embodiment of the present invention, the at least one first unit region is separated from the other first unit regions close to the at least one first unit region by at least one pixel region.

According to one embodiment of the present invention, the first positional shift is between 0.5 and 2 micrometers.

According to one embodiment of the present invention, a width of the first alignment patterns in at least one first unit region is different from a width of the first alignment patterns in other first unit regions close to the at least one first unit region.

According to one embodiment of the present invention, in each of the pixel regions, a width of a portion of the first alignment patterns is different from a width of another portion of the first alignment patterns.

According to one embodiment of the present invention, a width difference between the first alignment patterns with different widths is between 0.3 and 1 micrometer.

According to one embodiment of the present invention, the second substrate includes a plurality of second unit regions, and each of the second unit regions includes at least a cell region, wherein each of the cell regions is disposed corresponding to one pixel region and has a plurality of second alignment patterns disposed therein.

According to one embodiment of the present invention, the at least one second unit region has a second positional shift relative to the other second unit regions close to the at least one second unit region.

According to one embodiment of the present invention, the at least one second unit region is adjacent to the others second unit regions close to the at least one second unit region.

According to one embodiment of the present invention, the at least one second unit region is separated from the other second unit regions close to the at least one second unit region by at least one cell region.

According to one embodiment of the present invention, the second positional shift is between 0.5 and 2 micrometers.

According to one embodiment of the present invention, a width of the second alignment patterns in at least one second unit region is different from a width of the second alignment patterns in other second unit regions close to the at least one second unit region.

According to one embodiment of the present invention, the at least one second unit region is adjacent to the other second unit regions close to the at least one second unit region.

According to one embodiment of the present invention, in each of the cell regions, a width of a portion of the second alignment patterns is different from a width of another portion of the second alignment patterns.

In the substrate of the liquid crystal display panel according to the present invention, the alignment patterns in different unit regions may have different widths, or the unit regions may have a positional shift therebetween. Consequently, when adjoined photomasks are used to perform an exposure process for fabricating the liquid crystal display panel, although the defects of width difference or misalignment between adjacent patterns, which result from discrepant exposures or low adjoining precision at the junctions of neighboring exposure regions, can not be avoided, the minor differences in width or position which already exist between the alignment patterns are contributive to obscuring the foregoing defects for enhancing the viewing quality of the liquid crystal display panel.

To make the above and other purposes, features, and advantages of the present invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
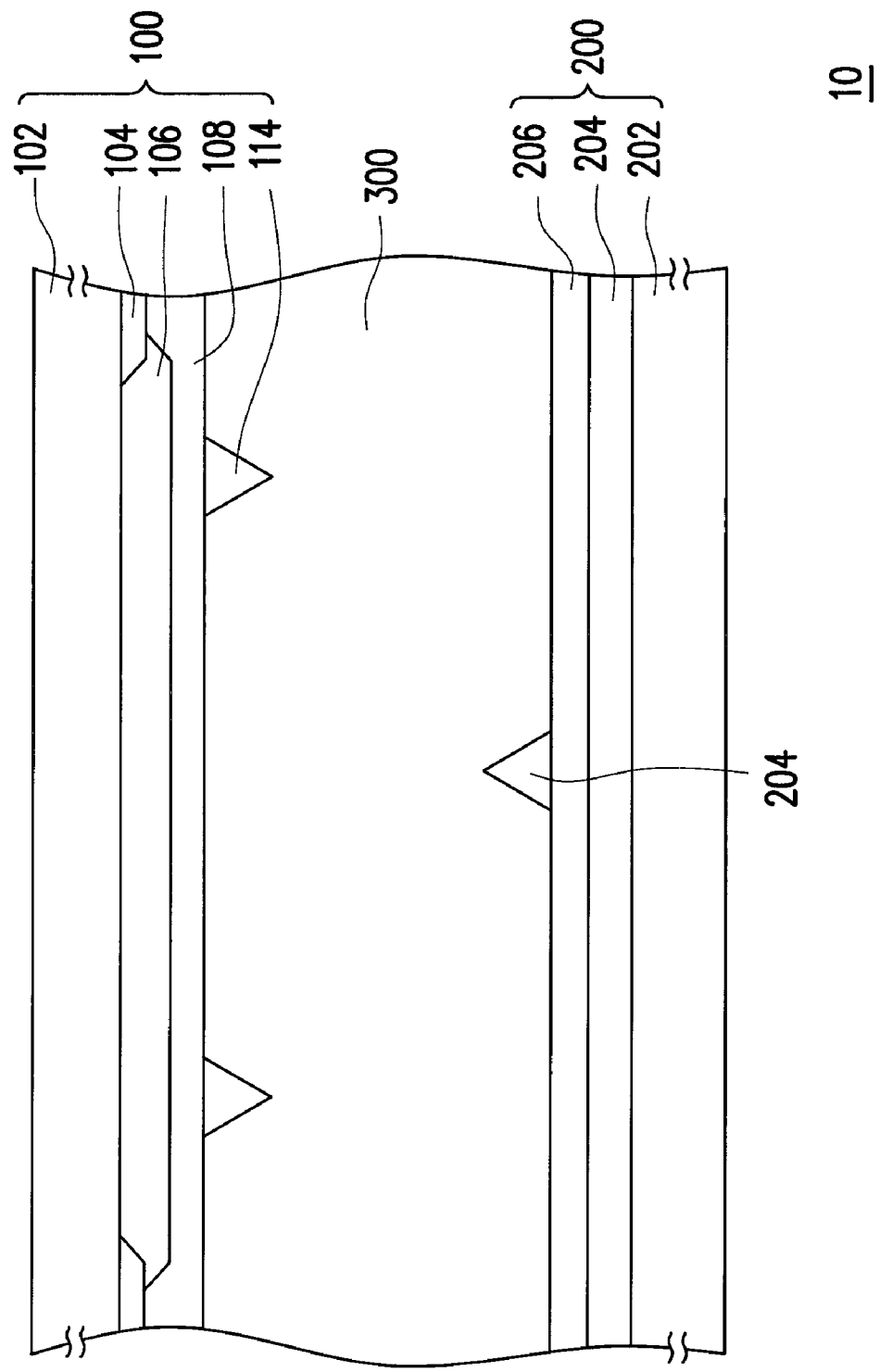
FIG. 1A is a cross-sectional view of a liquid crystal display panel according to the first embodiment of the present invention.
Figure 1B:
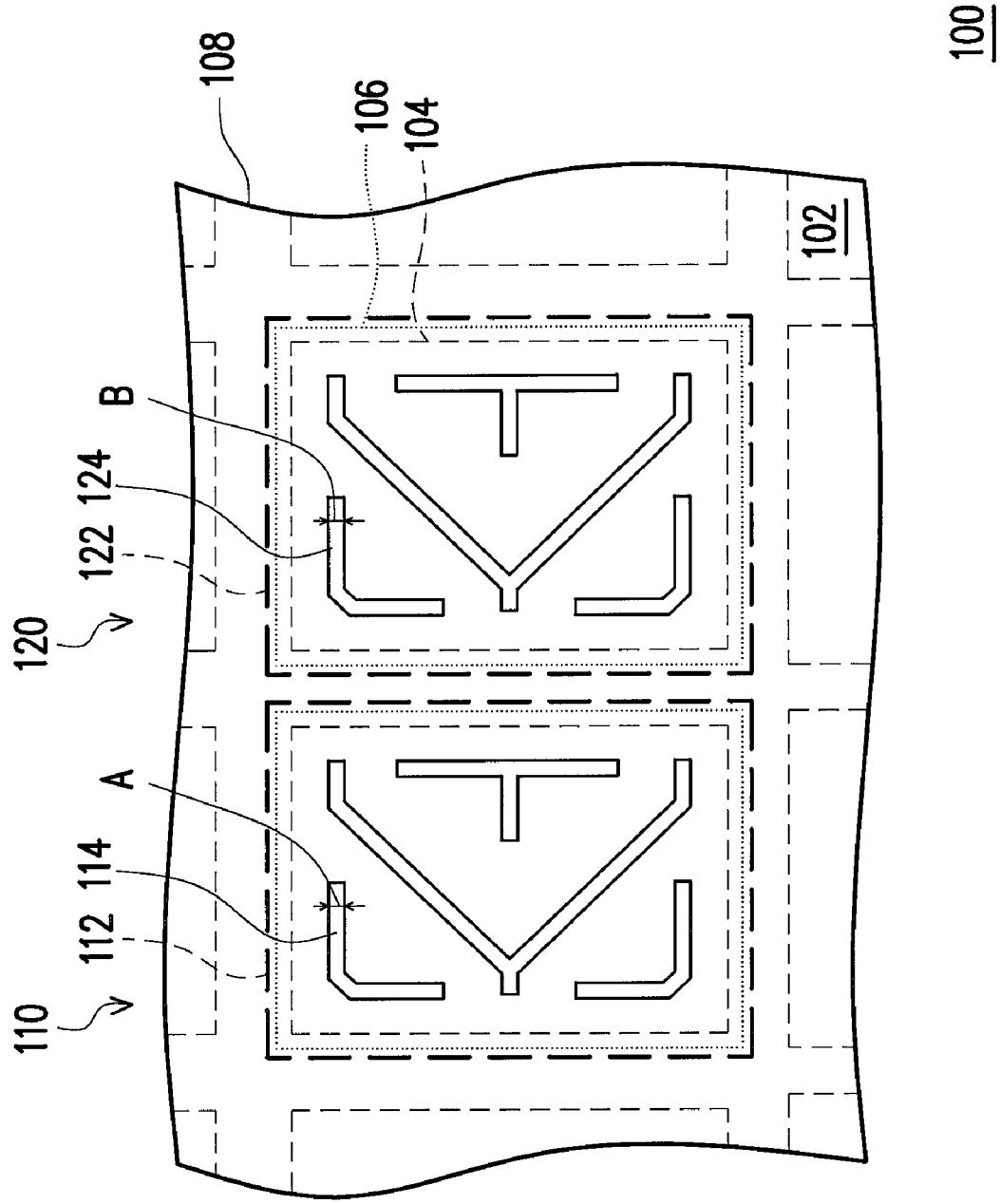
FIG. 1B is a partial top view of a first substrate according to the first embodiment of the present invention.
Figure 1C:
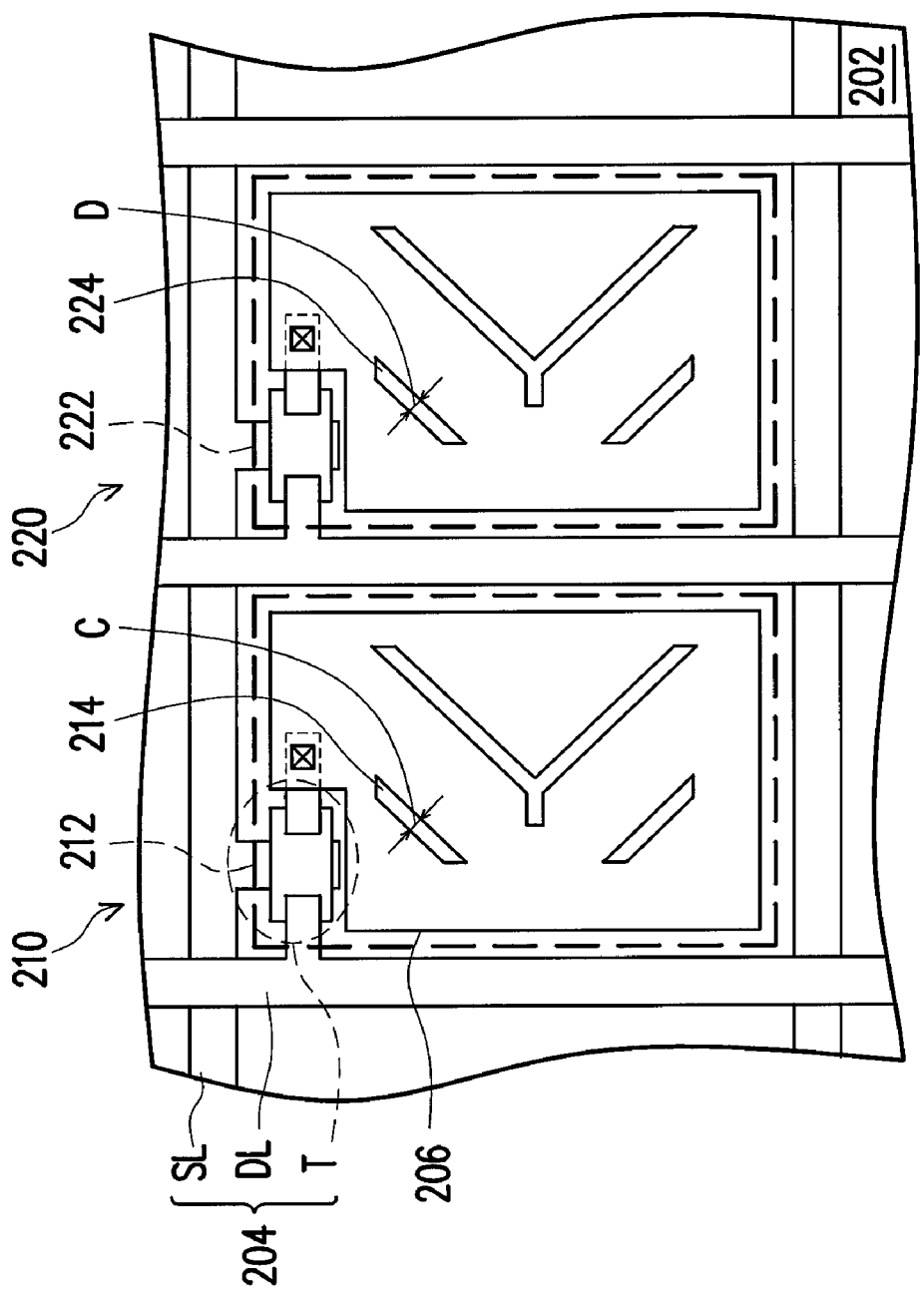
FIG. 1C is a partial top view of a second substrate according to the first embodiment of the present invention.

FIG. 1A is a cross-sectional view of a liquid crystal display panel according to the first embodiment of the present invention. FIG. 1B is a partial top view of a first substrate according to the first embodiment of the present invention. FIG. 1C is a partial top view of a second substrate according to the first embodiment of the present invention.

Referring to FIG. 1A and FIG. 1B, in this embodiment, a first substrate 100 is, for example, a color filter substrate, which includes a substrate 102, black matrixes 104, a plurality of color filter patterns 106, a common electrode 108, and a plurality of first alignment patterns 114 and 124. The black matrixes 104 are disposed on the substrate 102, and the plurality of color filter patterns 106 is located between the black matrixes 104. The color filter patterns 106 may be red, green, or blue color filter patterns. The common electrode 108 is disposed above the black matrixes 104 and the color filter patterns 106. In this embodiment, the first alignment patterns 114 and 124 are, for example, protrusions disposed on the common electrode 108, but the present invention is not limited thereto. In other embodiments, the first alignment patterns may also be slits of the common electrode.

Figure 2:
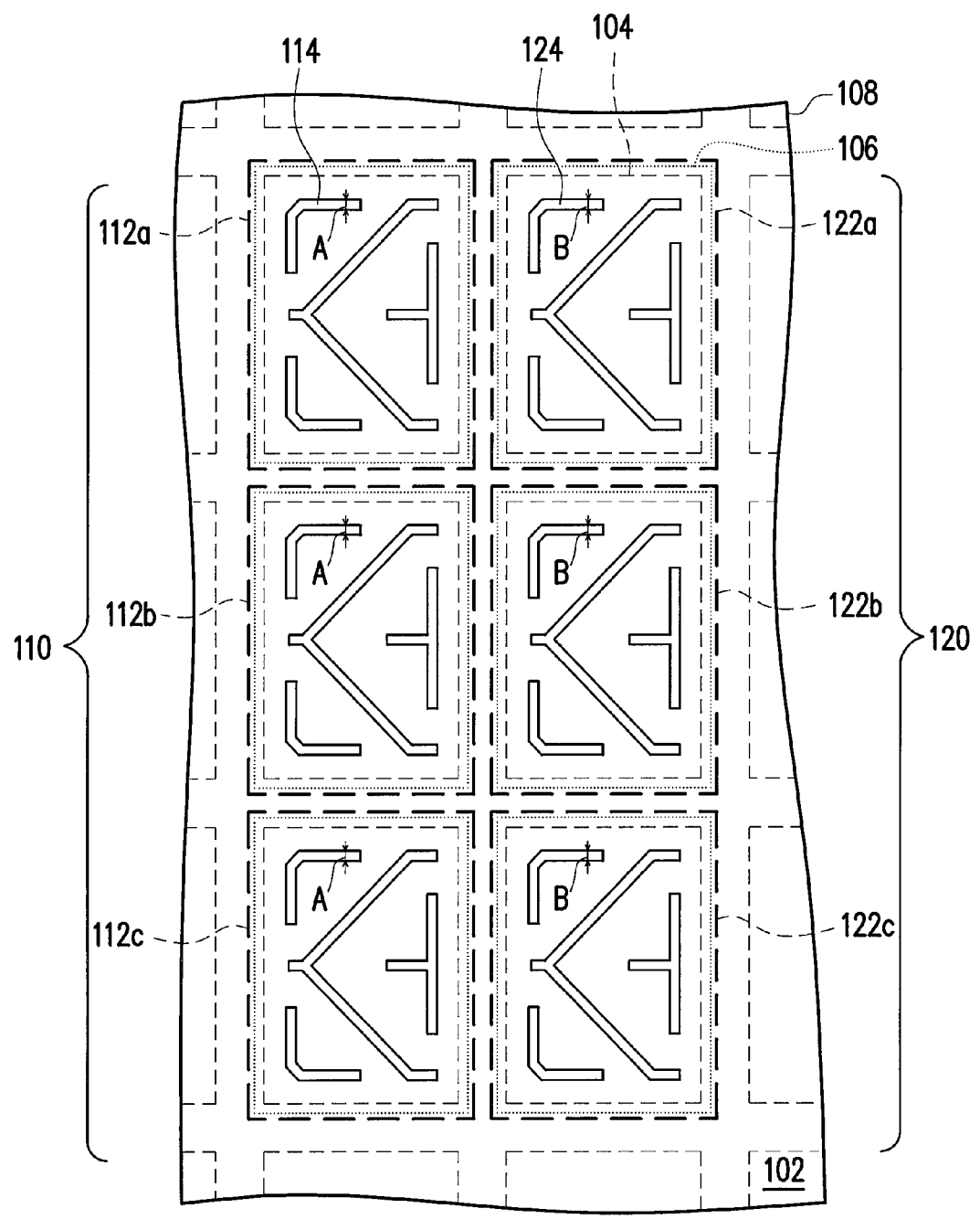
FIG. 2 is a partial top view of a first substrate according to one embodiment of the present invention.

With reference to FIG. 1B, the first substrate 100 comprises a plurality of first unit regions 110 and 120. For simplicity and clarity, only two first unit regions 110 and 120 are illustrated in FIG. 1B. In this embodiment, the first unit regions 110 and 120 respectively include pixel regions 112 and 122, for instance. The color filter patterns 106 are, for example, disposed in each of the pixel regions 112 and 122. That is, the pixel regions 112 and 122 respectively correspond to one color filter pattern 106. Each of the pixel regions 112 and 122 has a plurality of first alignment patterns 114 and 124 disposed therein. In this embodiment, a width A of the first alignment patterns 114 in the first unit region 110 is different from a width B of the first alignment patterns 124 in the first unit region 120 close to the first unit region 110. Herein, a width difference between the first alignment patterns 114 and 124 is, for example, between 0.3 and 1 micrometer. In this embodiment, the first unit regions 110 and 120 which have the first alignment patterns 114 and 124 with different widths are, for example, adjacent to each other. However, in other embodiments, the first unit regions which have the first alignment patterns with different widths may not be adjacent to each other. That is, at least one pixel region may be located therebetween. Furthermore, one first unit region having one pixel region is taken as an example in this embodiment, but the present invention is not limited thereto. In other embodiments, one first unit region may include a plurality of pixel regions. For instance, in a first substrate 100a as shown in FIG. 2, the first unit region 110 comprises a plurality of pixel regions 112a, 112b, and 112c, and the first unit region 120 comprises a plurality of pixel regions 122a, 122b, and 122c. Herein, the first alignment patterns 114 in the pixel regions 112a, 112b, and 112c have the width A, and the first alignment patterns 124 in the pixel regions 122a, 122b, and 122c have the width B. In other words, the width A of the first alignment patterns 114 in the pixel regions 112a, 112b, and 112c is different from the width B of the first alignment patterns 124 in the pixel regions 122a, 122b, and 122c. Herein, the width difference between the first alignment patterns 114 and 124 is, for example, between 0.3 and 1 micrometer.

Figure 3:
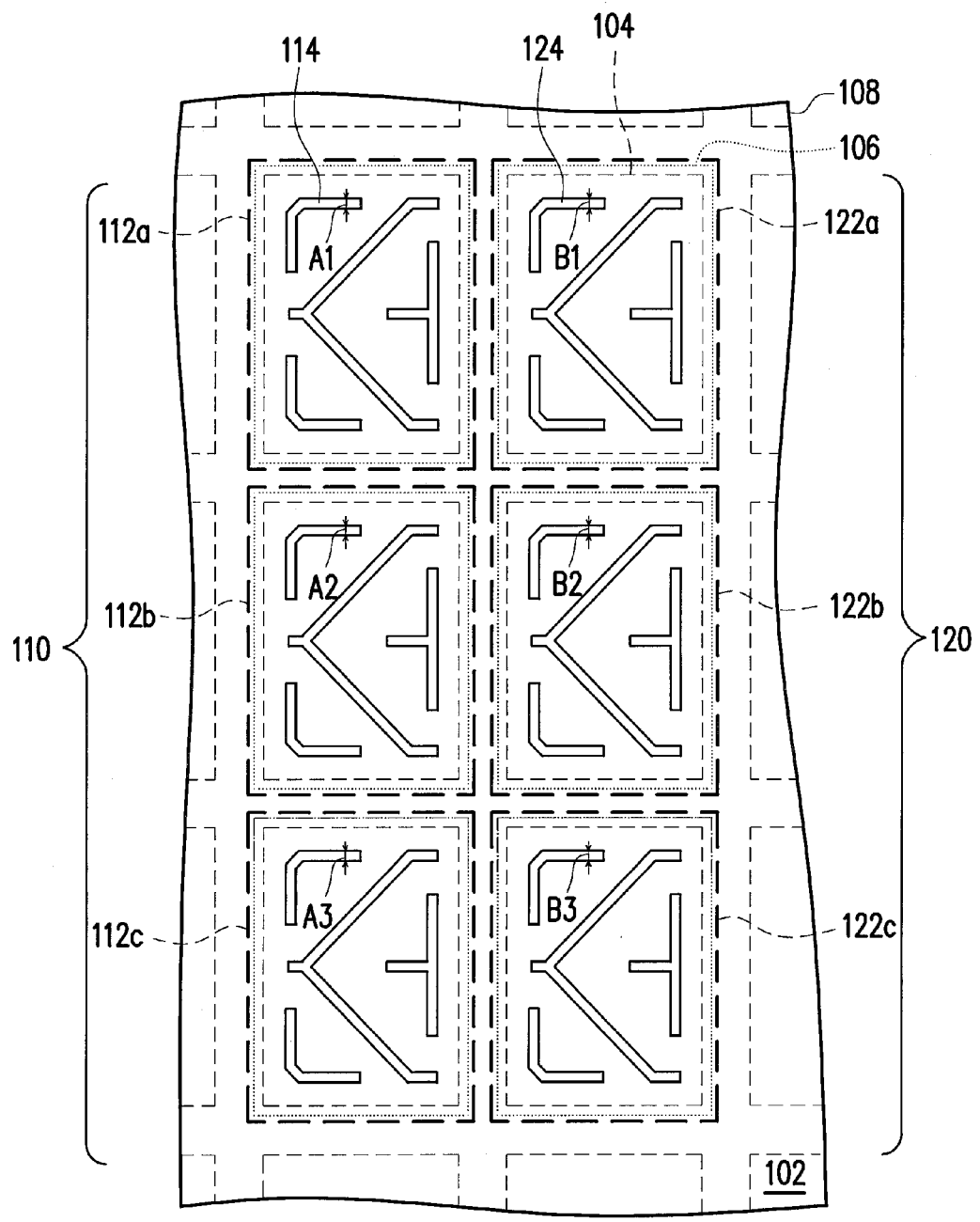
FIG. 3 is a partial top view of a first substrate according to one embodiment of the present invention.

In addition, the first alignment patterns in the same first unit region may have different widths. For example, referring to a first substrate 100b as shown in FIG. 3, in the first unit region 110, the first alignment patterns 114 in the pixel regions 112a, 112b, and 112c respectively have widths A1, A2, and A3. Further, in the first unit region 120, the first alignment patterns 124 in the pixel regions 122a, 122b, and 122c respectively have widths B1, B2, and B3. In other words, the widths A1, A2, and A3 of the first alignment patterns 114 in the first unit region 110 are different from the widths B1, B2, and B3 of the first alignment patterns 124 in the nearby first unit region 120. Moreover, within the same first unit region, the width of the first alignment patterns in at least a portion of the pixel regions is different from the width of the first alignment patterns in another portion of the pixel regions. Herein, the width difference between the first alignment patterns 114 and 124 in the same first unit region or in different first unit regions is between 0.3 and 1 micrometer, for example.

Figure 4:
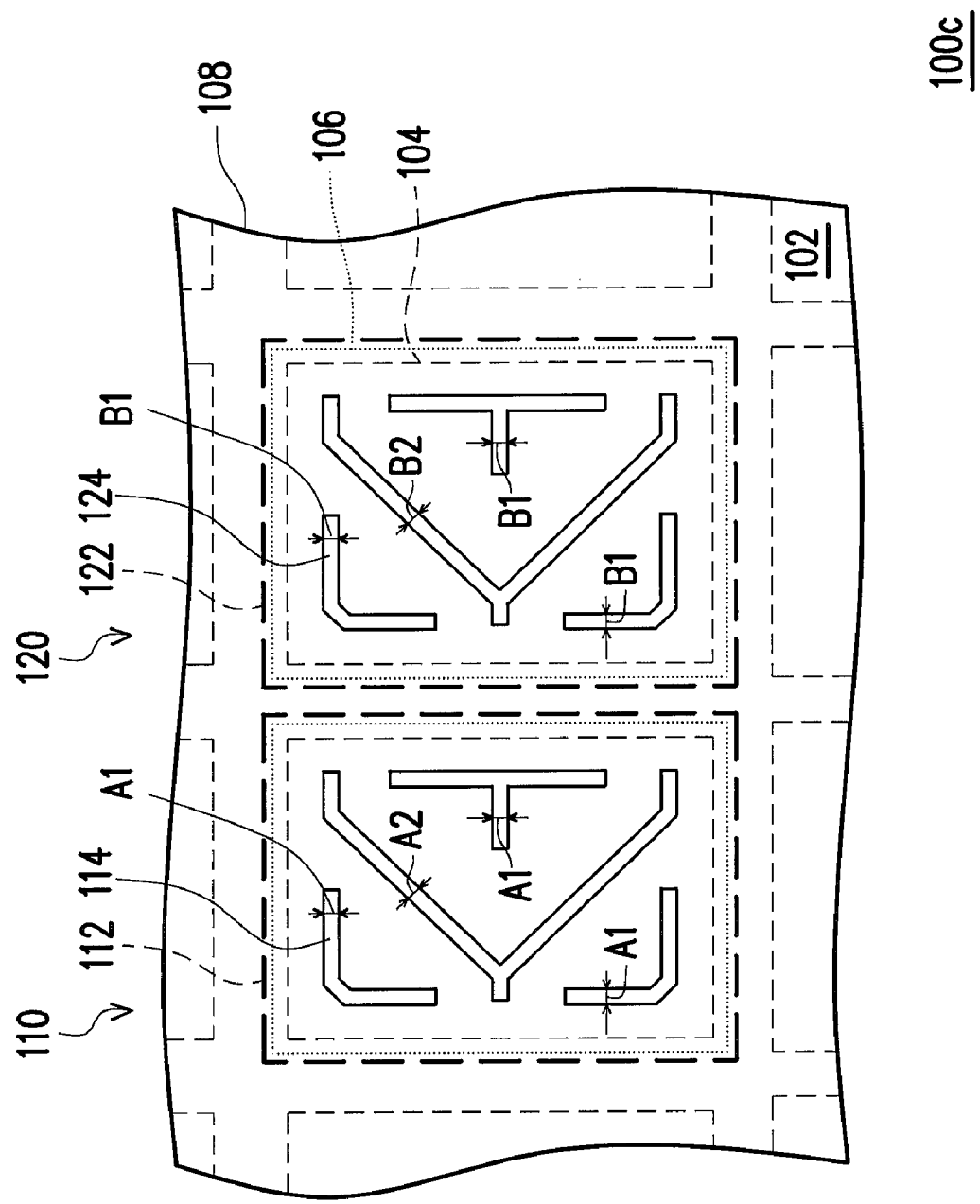
FIG. 4 is a partial top view of a first substrate according to one embodiment of the present invention.

In the above embodiments, the first alignment patterns in one pixel region, for example, have the same width. However, the present invention is not limited thereto. In a first substrate 100c as shown in FIG. 4, the adjacent first alignment patterns 114 in the pixel region 112 of the first unit region 110 have different widths A1 and A2; and the adjacent first alignment patterns 124 in the pixel region 122 of the second unit region 120 have different widths B1 and B2. Herein, the width difference between the first alignment patterns 114 and 124 in the same pixel region or in different unit regions is between 0.3 and 1 micrometer, for example. In this embodiment, the first alignment patterns having different widths are, for example, adjacent to each other. However, these first alignment patterns having different widths may also be separated from each other. That is to say, in the same pixel region, the width of at least a portion of the first alignment patterns is different from the width of another portion of the first alignment patterns.

Referring to FIGS. 1A and 1C, in this embodiment, the second substrate 200 is, for example, an active device array substrate which is disposed opposite to the first substrate 100. The second substrate 200 includes a substrate 202, an active layer 204, a pixel electrode 206, and a plurality of second alignment patterns 214 and 224. Specifically, the active layer 204 is disposed on the substrate 202 and comprises a plurality of scan lines SL, a plurality of data lines DL, and a plurality of active devices T, wherein the scan lines SL and the data lines DL interlace each other, and the active devices T are electrically connected to the corresponding scan lines SL and data lines DL. The pixel electrode 206 is disposed on the active layer 204 and electrically connected to the corresponding active device T. In this embodiment, the second alignment patterns 214 and 224 are, for example, protrusions disposed on the pixel electrode 206, but the present invention is not limited thereto. In other embodiments, the second alignment patterns may also be slits of the pixel electrode.

Figure 5:
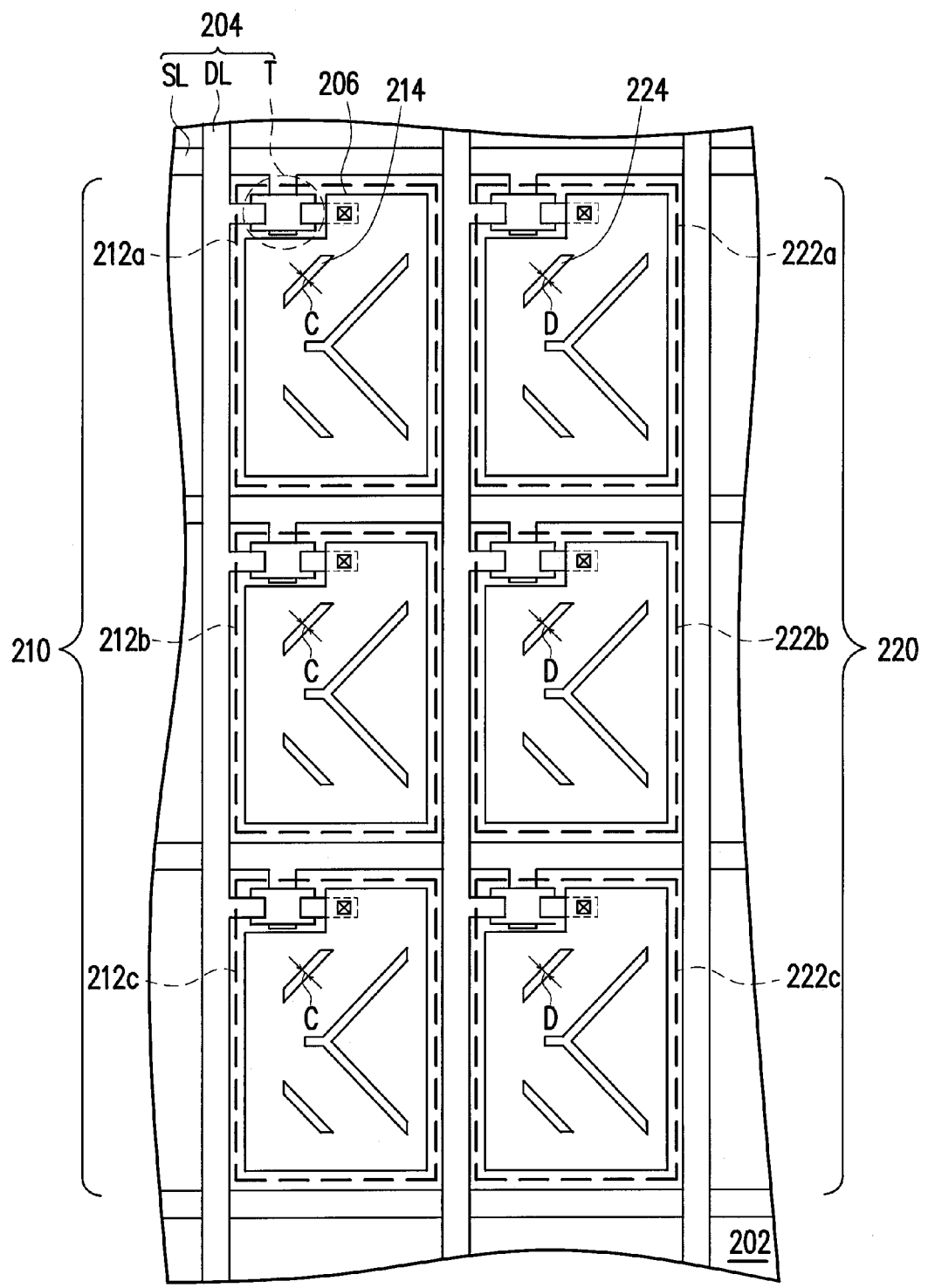
FIG. 5 is a partial top view of a second substrate according to one embodiment of the present invention.

With reference to FIG. 1C, the second substrate 200 comprises a plurality of second unit regions 210 and 220. For simplicity and clarity, only two second unit regions 210 and 220 are illustrated in FIG. 1C. In this embodiment, the second unit region 210 includes a cell region 212, and the second unit region 220 includes a cell region 222, for instance. The pixel electrode 206 is, for example, located in each of the cell regions 212 and 222. That is, each of the cell regions 212 and 222 corresponds to one pixel electrode 206. Each of the cell regions 212 and 222 has a plurality of second alignment patterns 214 and 224 disposed therein. In this embodiment, a width C of the second alignment patterns 214 in the second unit region 210 is different from a width D of the second alignment patterns 224 in the second unit region 220 close to the second unit region 210. Herein, a width difference between the second alignment patterns 214 and 224 is, for example, between 0.3 and 1 micrometer. In this embodiment, the second unit regions 210 and 220 which have the second alignment patterns 214 and 224 with different widths are, for example, adjacent to each other. However, in other embodiments, the second unit regions which have the second alignment patterns with different widths may be separated from each other. That is, at least one cell region may be located therebetween. Furthermore, one second unit region having one cell region is taken as an example in this embodiment, but the present invention is not limited thereto. In other embodiments, one second unit region may include a plurality of cell regions. For instance, in a second substrate 200a as shown in FIG. 5, the second unit region 210 comprises a plurality of cell regions 212a, 212b, and 212c, and the second unit region 220 comprises a plurality of cell regions 222a, 222b, and 222c. Herein, the second alignment patterns 214 in the cell regions 212a, 212b, and 212c have the width C, and the second alignment patterns 224 in the cell regions 222a, 222b, and 222c have the width D. In other words, the width C of the second alignment patterns 214 in the cell regions 212a, 212b, and 212c is different from the width D of the second alignment patterns 224 in the cell regions 222a, 222b, and 222c.

Herein, the width difference between the second alignment patterns 214 and 224 is, for example, between 0.3 and 1 micrometer.

Figure 6:
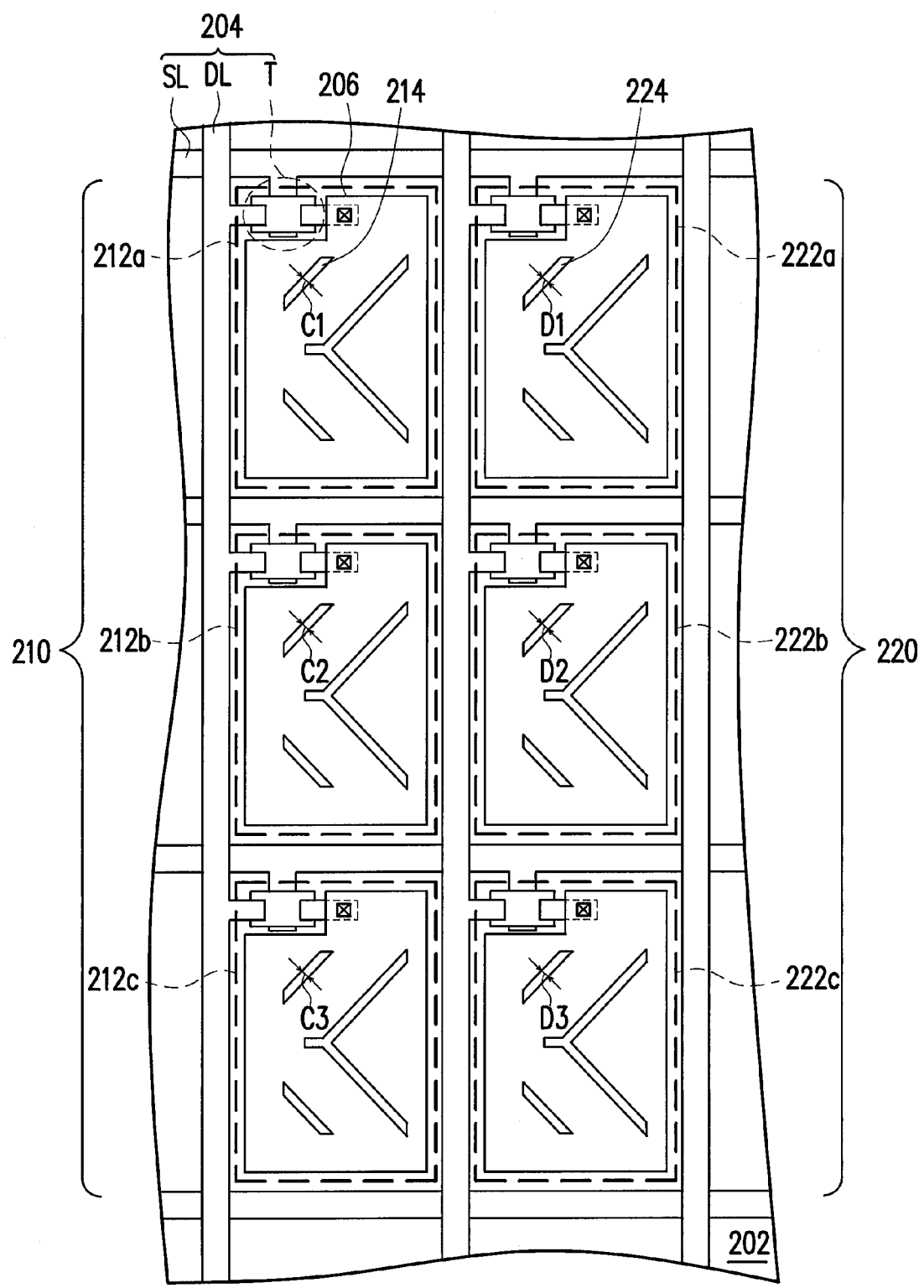
FIG. 6 is a partial top view of a second substrate according to one embodiment of the present invention.

Moreover, the second alignment patterns in the same second unit region may also have different widths. For instance, in a second substrate 200b as shown in FIG. 6, the second alignment patterns 214 in the cell regions 212a, 212b, and 212c of the second unit region 210 respectively have widths C1, C2, and C3. Further, the second alignment patterns 224 in the cell regions 222a, 222b, and 222c of the second unit region 220 respectively have widths D1, D2, and D3. That is to say, the widths C1, C2, and C3 of the second alignment patterns 214 in the second unit region 210 are different from the widths D1, D2, and D3 of the second alignment patterns 224 in the nearby second unit region 220. Moreover, within the same second unit region, the width of the second alignment patterns in at least a portion of the cell regions is different from the width of the second alignment patterns in another portion of the cell regions. Herein, the width difference between the second alignment patterns 214 and 224 in the same second unit region or in different second unit regions is between 0.3 and 1 micrometer, for example.

Figure 7:
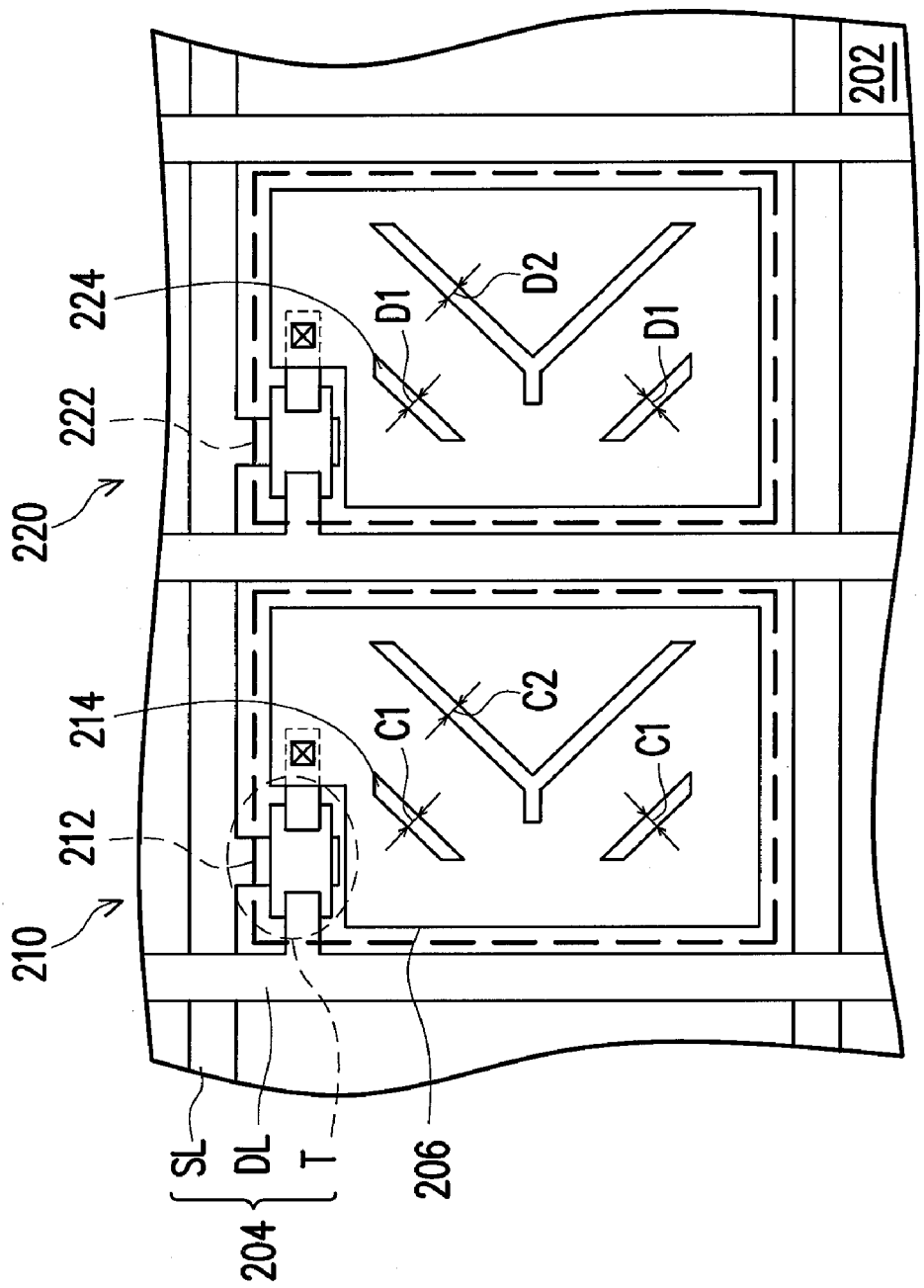
FIG. 7 is a partial top view of a second substrate according to one embodiment of the present invention.

Additionally, in the above embodiments, the second alignment patterns in one cell region, for example, all have the same width. However, the present invention is not limited thereto. In a second substrate 200c as shown in FIG. 7, the adjacent second alignment patterns 214 in the cell region 212 of the second unit region 210 have different widths C1 and C2; and the adjacent second alignment patterns 224 in the cell region 222 of the second unit region 220 have different widths D1 and D2. Herein, the width difference between the second alignment patterns 214 and 224 in the same cell region or in different unit regions is between 0.3 and 1 micrometer, for example. In this embodiment, the second alignment patterns having different widths are, for example, adjacent to each other. However, these second alignment patterns having different widths may also be separated from each other. That is, in the same cell region, the width of at least a portion of the second alignment patterns is different from the width of another portion of the second alignment patterns.

Referring to FIG. 1A, the first substrate 100 and the second substrate 200 are assembled into a liquid crystal display panel 10. The liquid crystal layer 300 is disposed between the first substrate 100 and the second substrate 200, and includes a plurality of liquid crystal molecules (not shown). The liquid crystal molecules are affected by the alignment patterns 114, 124, 214, and 224, as illustrated in FIGS. 2 and 5, to tilt in different angles, such that the liquid crystal display panel 10 has the property of wide viewing angle. It should be noted that the first substrate in the liquid crystal display panel of the present invention may be the first substrates 100a, 100b, or 100c as shown in FIG. 2, 3, or 4. Moreover, the second substrate may be the second substrates 200a, 200b, or 200c in FIG. 5, 6, or 7.

In the aforementioned embodiments, the alignment patterns on the substrate may have different widths. In the process of forming alignment patterns with adjoined photomasks, although the defect of width difference between adjacent alignment patterns, which results from discrepant exposures at the junctions of neighboring exposure regions, can not be avoided, the minor width differences which already exist between the alignment patterns in different unit regions are contributive to obscuring the foregoing defect, and further to enhance the viewing quality of the liquid crystal display panel.

Second Embodiment

Figure 8A:
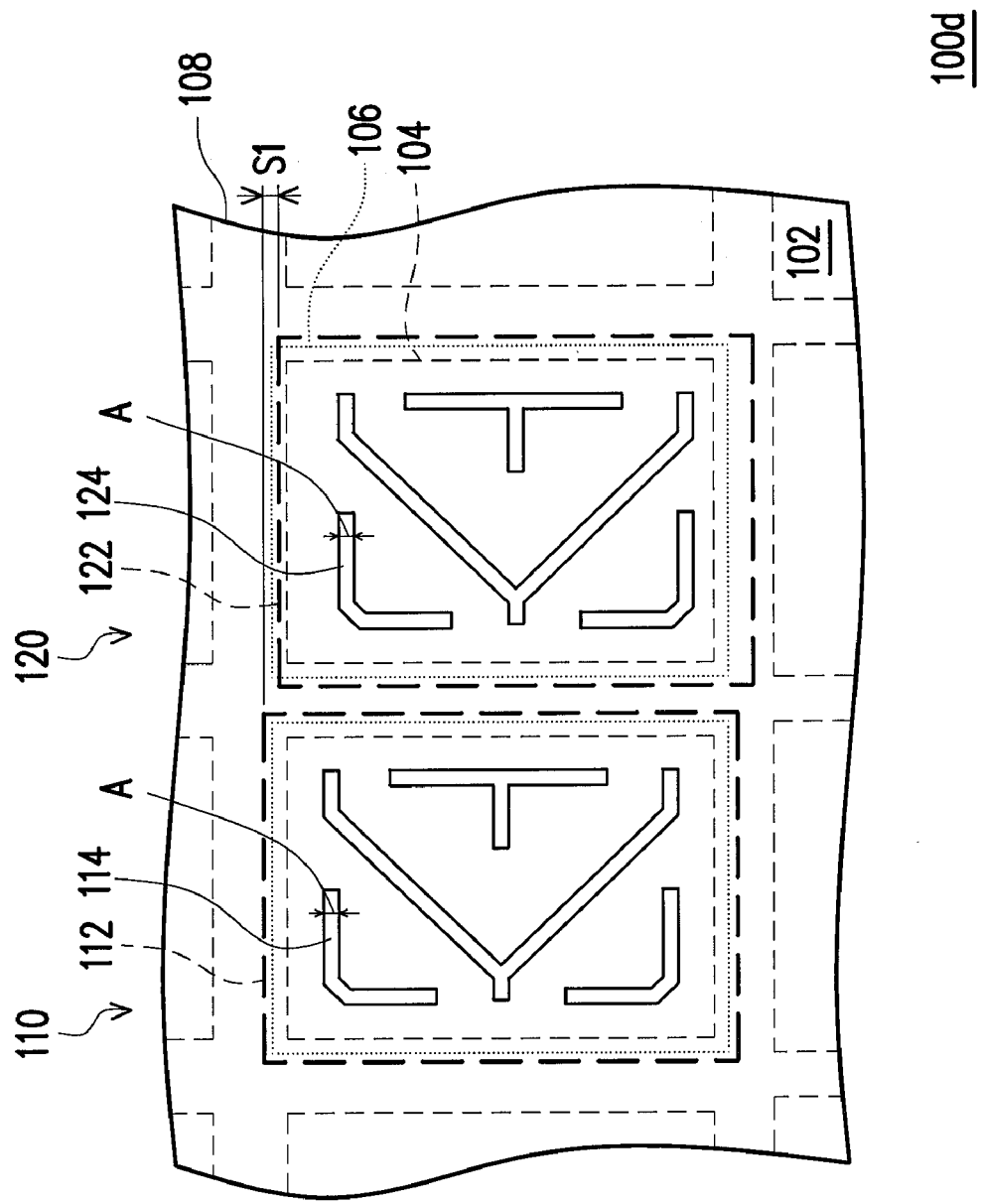
FIG. 8A is a partial top view of a first substrate according to the second embodiment of the present invention.
Figure 8B:
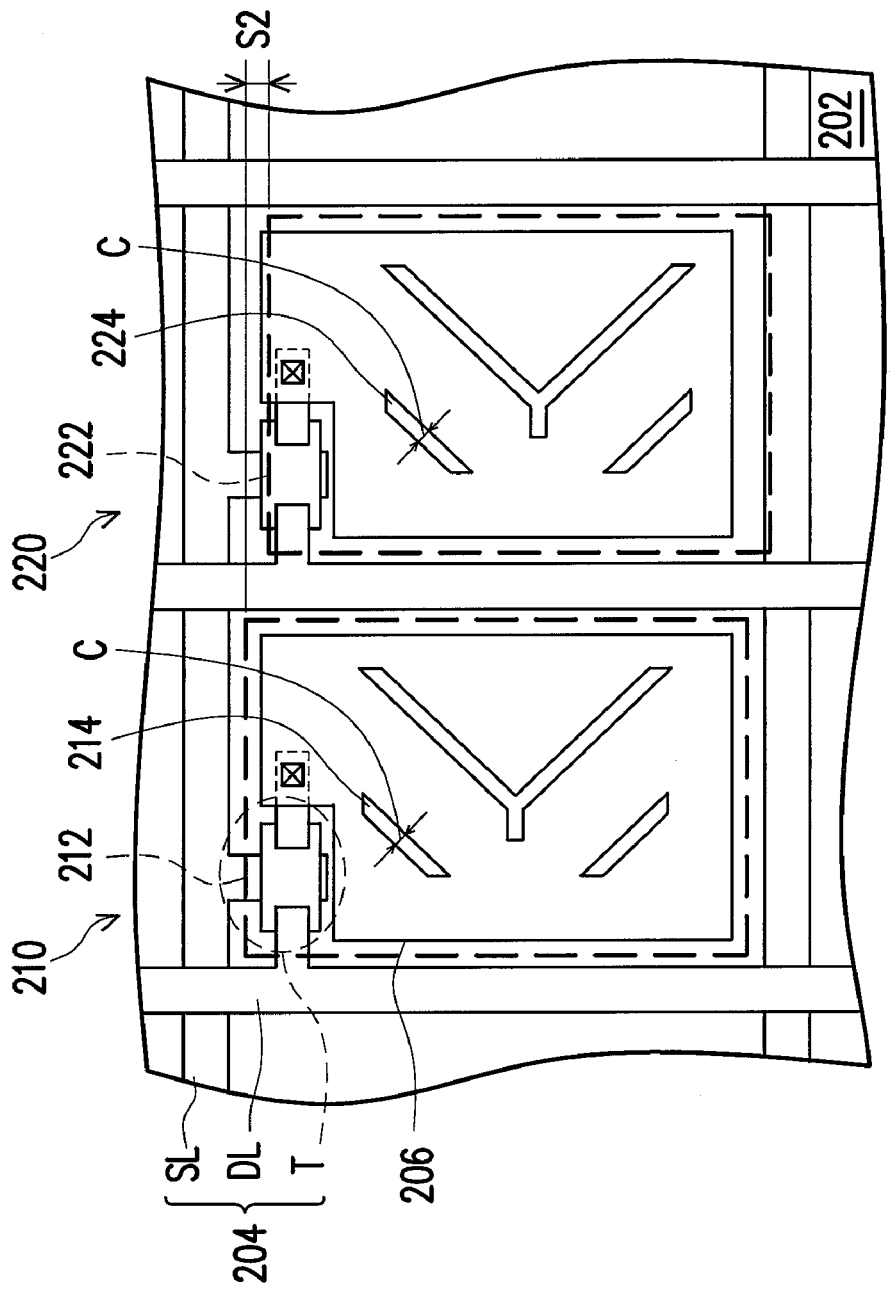
FIG. 8B is a partial top view of a second substrate according to the second embodiment of the present invention.

FIG. 8A is a partial top view of a first substrate according to the second embodiment of the present invention. FIG. 8B is a partial top view of a second substrate according to the second embodiment of the present invention. In this embodiment, a first substrate 100d and a second substrate 200d are respectively similar to the first substrate 100 in FIG. 1B and the second substrate 200 in FIG. 1C. Identical elements are indicated by the same reference numbers, and the descriptions thereof are not repeated hereinafter.

Figure 9:
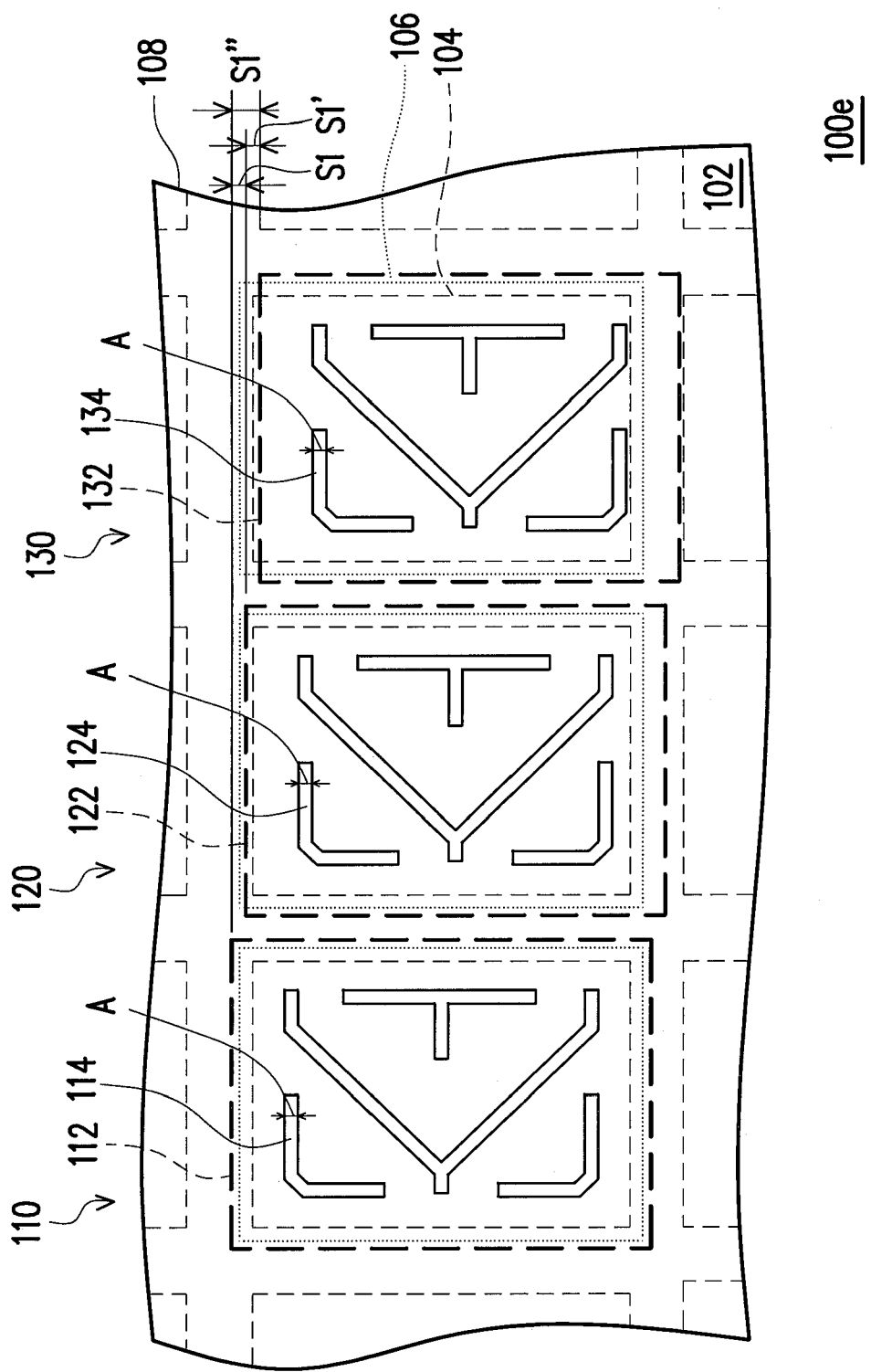
FIG. 9 is a partial top view of a first substrate according to one embodiment of the present invention.
Figure 10:
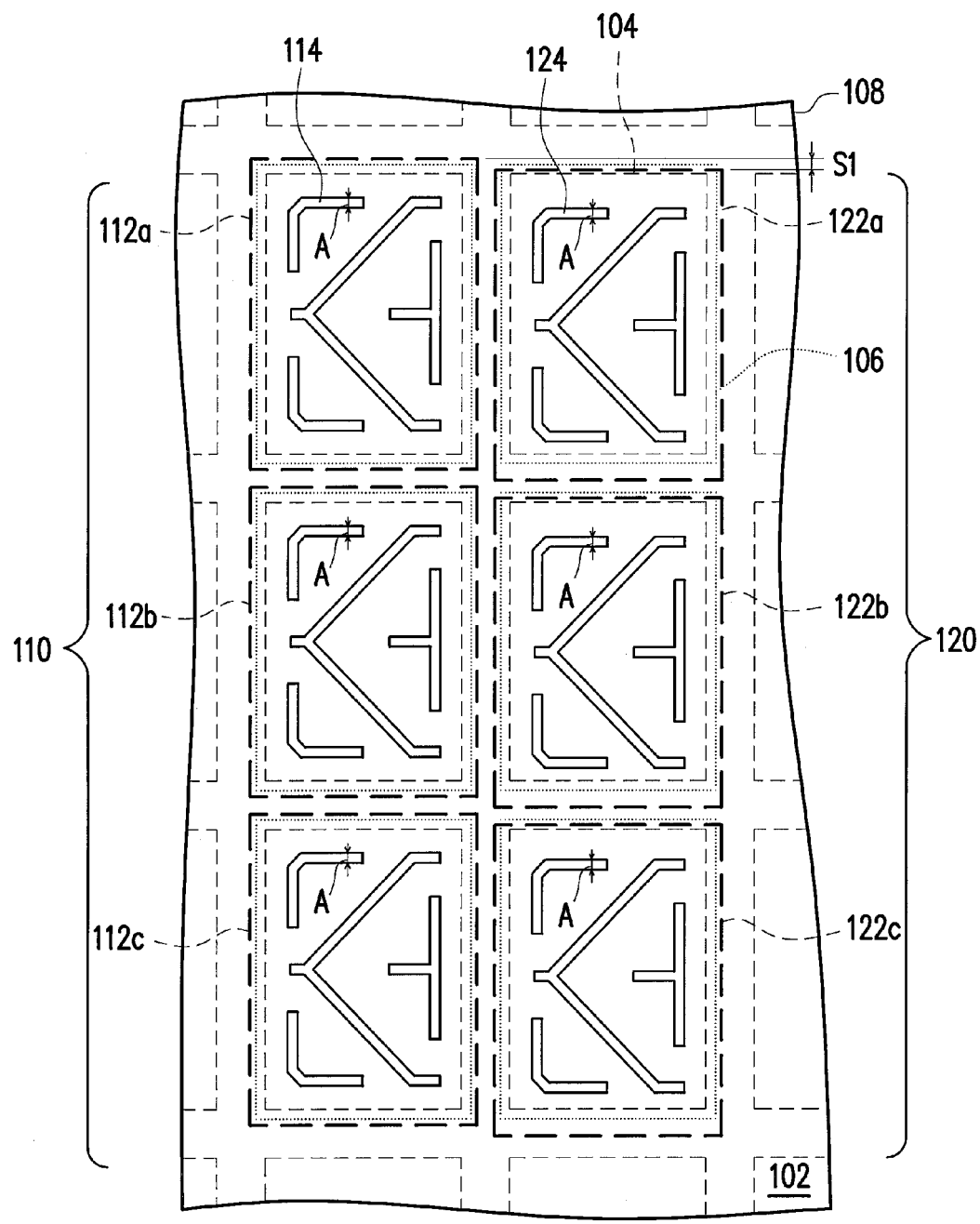
FIG. 10 is a partial top view of a first substrate according to one embodiment of the present invention.

In the first substrate 100d as illustrated in FIG. 8A, the first unit region 110 includes one pixel region 112 and the first unit region 120 includes one pixel region 122, for example. Further, a plurality of first alignment patterns 114 and 124 are respectively disposed in the pixel regions 112 and 122. In this embodiment, the first alignment patterns 114 and 124 have the same width A, for example. Herein, the first unit region 110 has a positional shift S1 relative to the nearby first unit region 120. Accordingly, the first alignment patterns 114 also have the positional shift S1 relative to the first alignment patterns 124 which are arranged as the first alignment patterns 114. In this embodiment, the positional shift S1 is, for example, between 0.5 and 2 micrometers. It is noted that the adjacent first unit regions 110 and 120 having the positional shift S1 therebetween is given as an example in this embodiment, but the present invention is not limited thereto. Referring to FIG. 9, a first substrate 100e includes a plurality of first unit regions 110, 120, and 130. Specifically, the first unit region 110 has the positional shift S1 relative to the first unit region 120; the first unit region 120 has a positional shift S1' relative to the first unit region 130; and the first unit region 110 also has a positional shift S1" relative to the first unit region 130. Moreover, the first unit regions having positional shifts therebetween may be adjacent to each other or separated from each other by at least one pixel region. In this embodiment, the positional shifts S1, S1', and S1" are, for example, between 0.5 and 2 micrometers. In the above embodiments, each of the first unit regions 110 and 120, for instance, has one pixel region 112 and 122, but the present invention is not limited thereto. Take a first substrate 100f as shown in FIG. 10 as an example, the first unit region 110 comprises a plurality of pixel regions 112a, 112b, and 112c, and the first unit region 120 comprises a plurality of pixel regions 122a, 122b, and 122c. Herein, the first unit region 110 has the positional shift S1 relative to the first unit region 120. That is to say, the pixel regions 112a, 112b, and 112c all have the positional shift S1 relative to the pixel regions 122a, 122b, and 122c.

Figure 11:
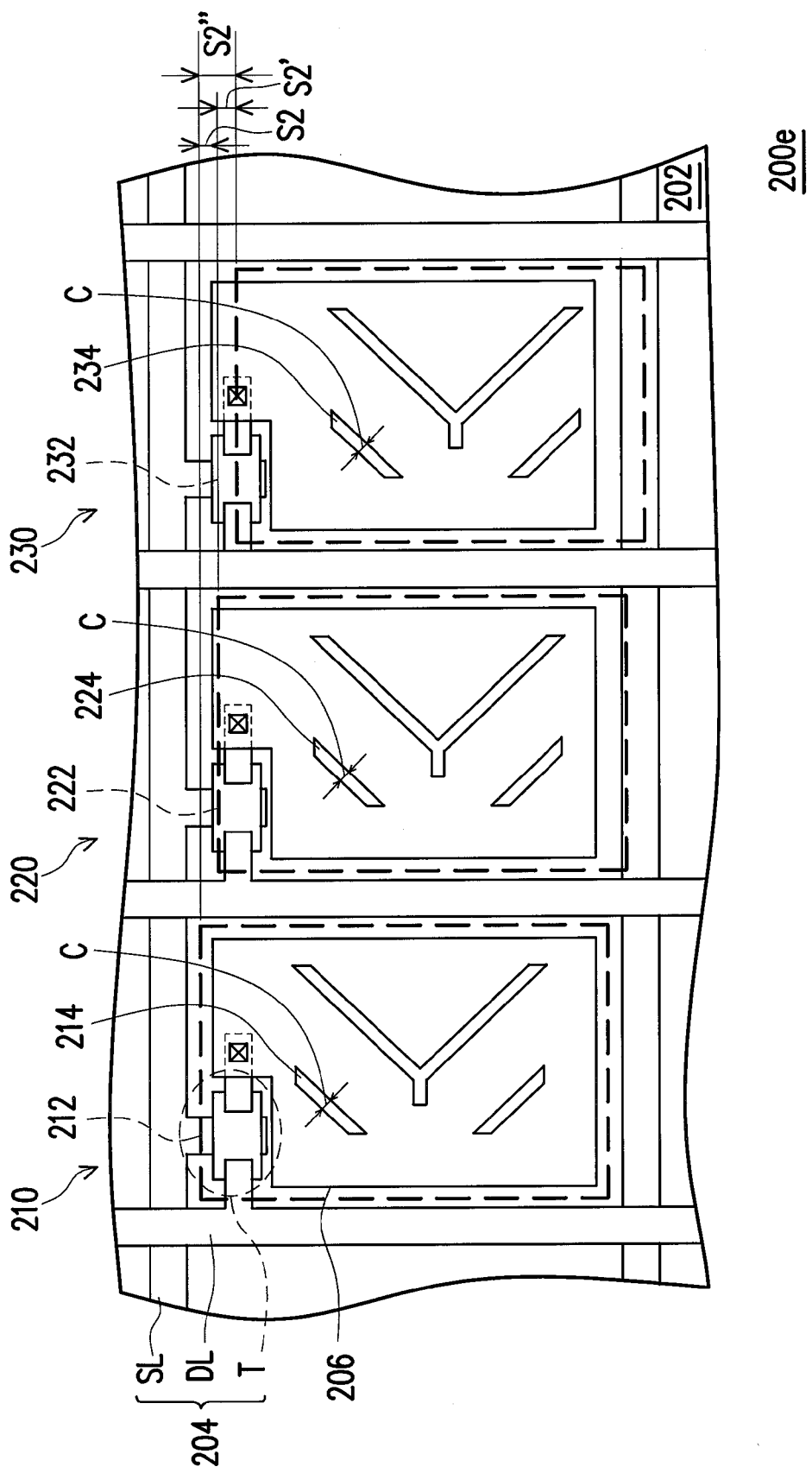
FIG. 11 is a partial top view of a second substrate according to one embodiment of the present invention.
Figure 12:
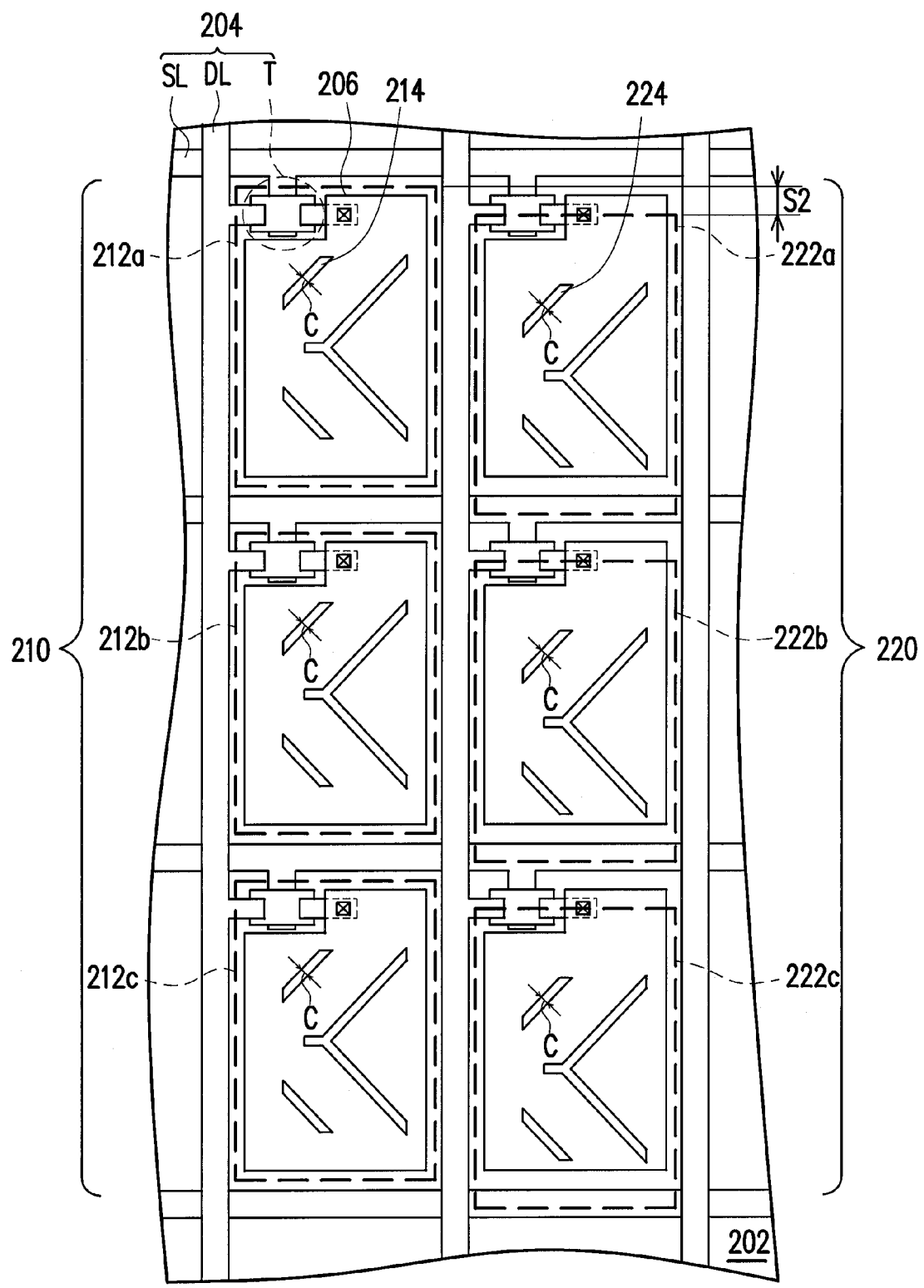
FIG. 12 is a partial top view of a second substrate according to one embodiment of the present invention.
Figure 13:
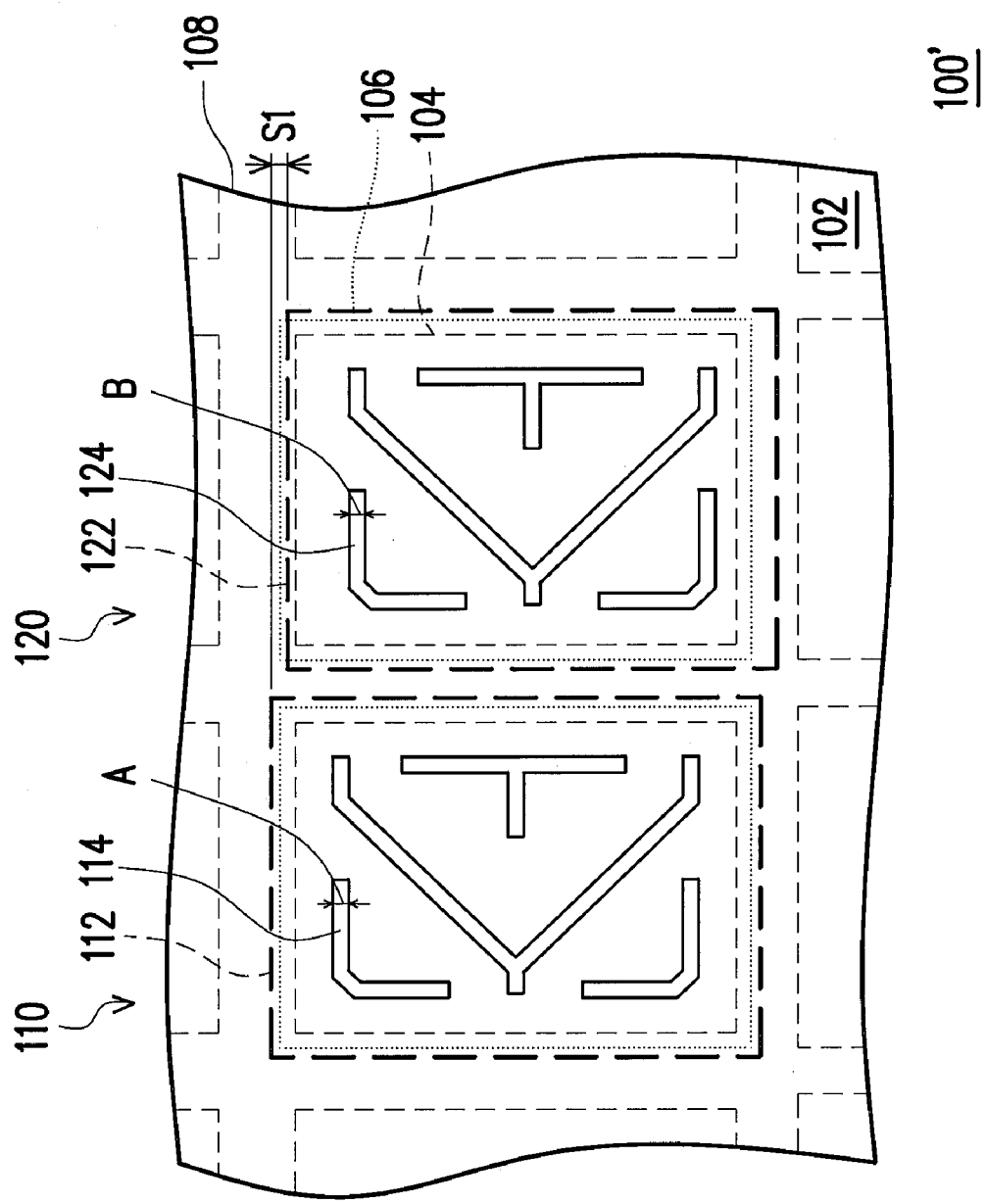
FIG. 13 is a partial top view of a first substrate according to one embodiment of the present invention.
Figure 14:
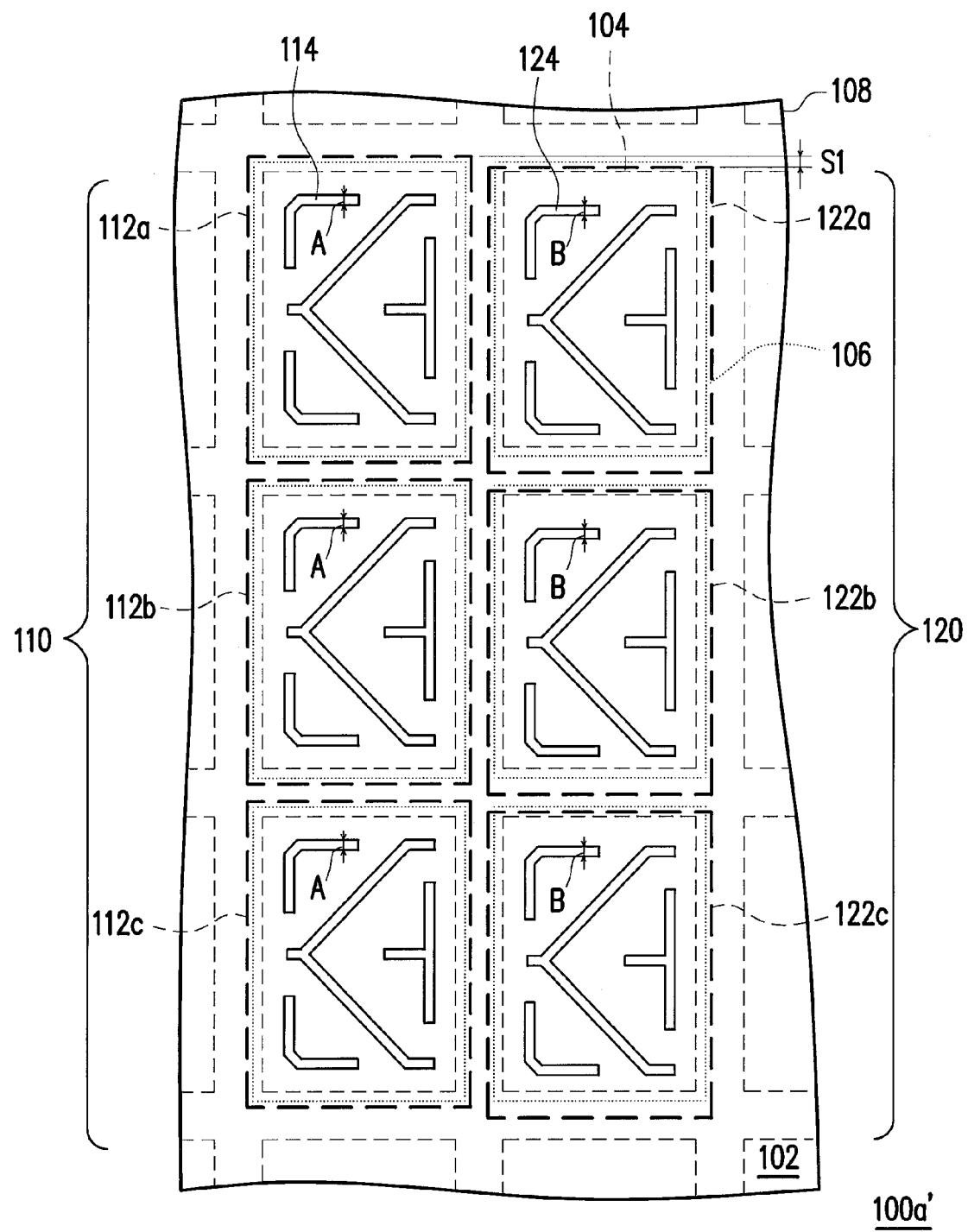
FIG. 14 is a partial top view of a first substrate according to one embodiment of the present invention.
Figure 15:
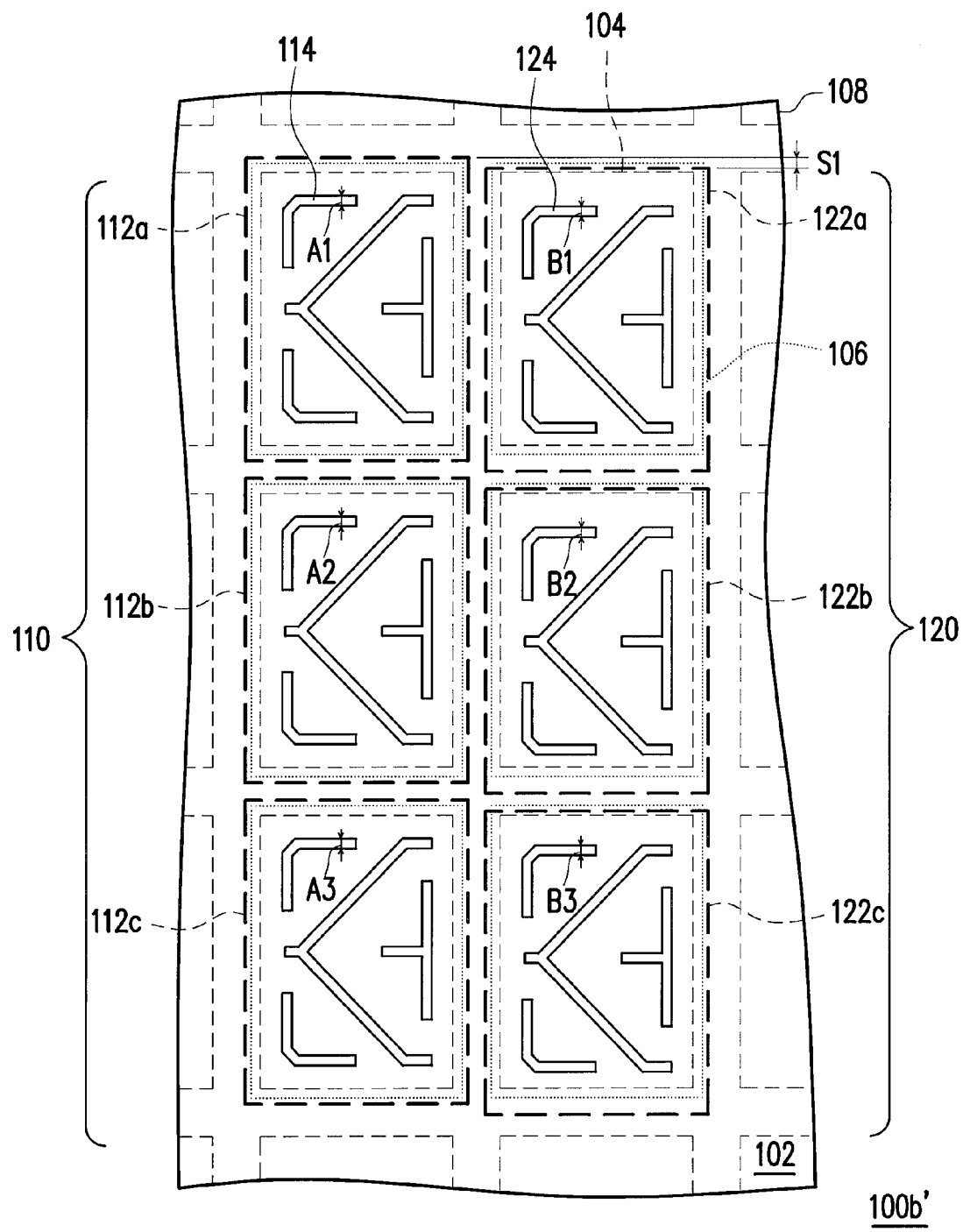
FIG. 15 is a partial top view of a first substrate according to one embodiment of the present invention.
Figure 16:
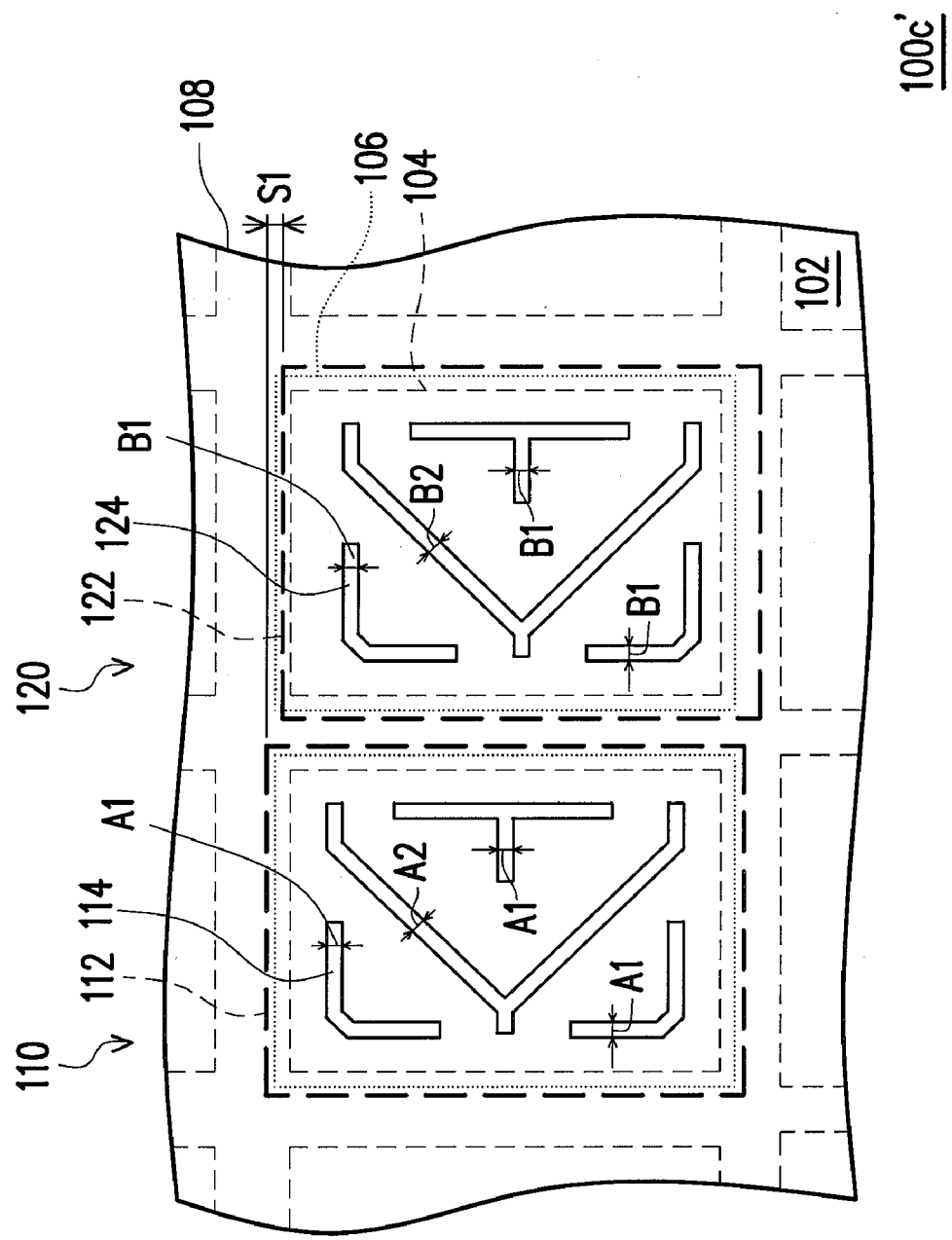
FIG. 16 is a partial top view of a first substrate according to one embodiment of the present invention.
Figure 17:
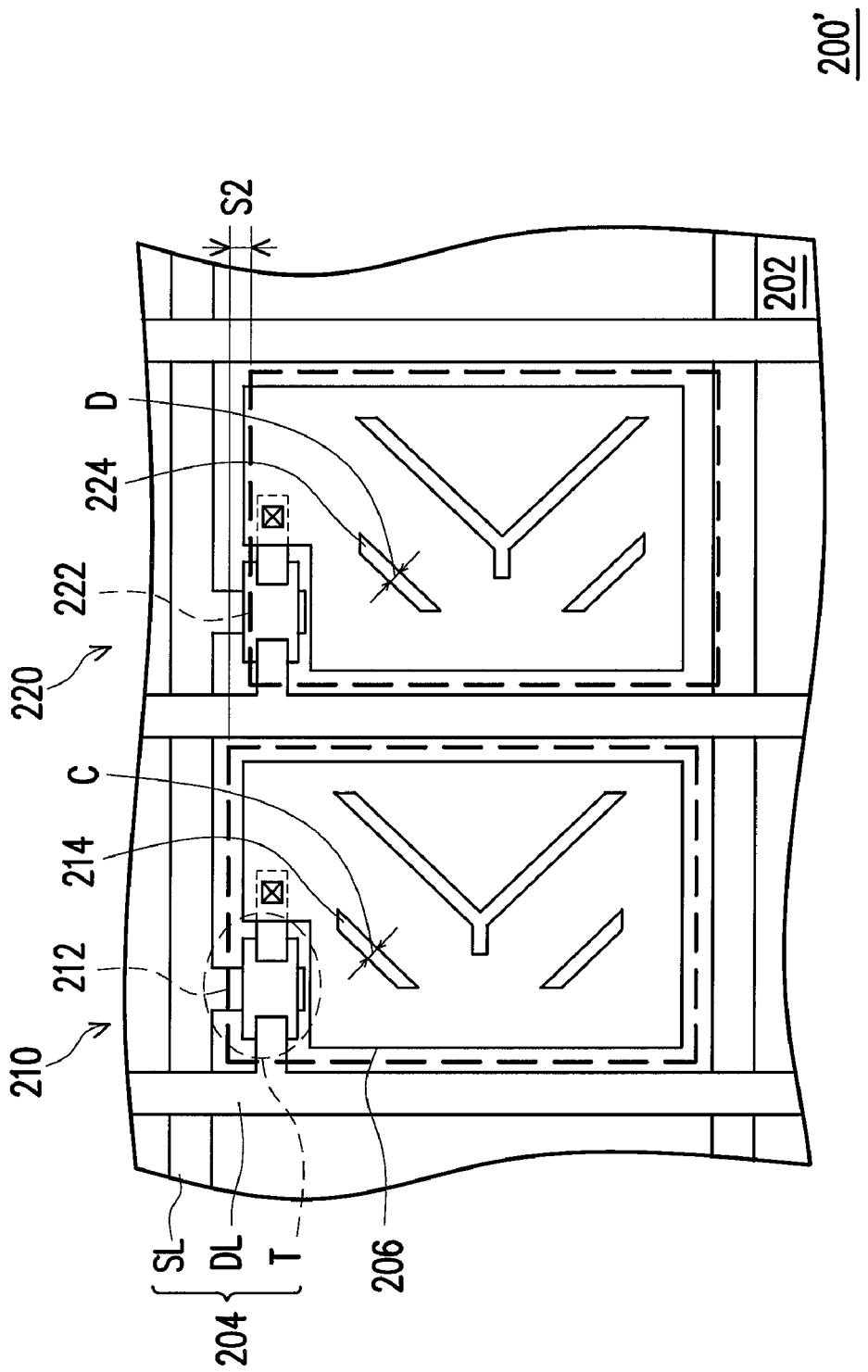
FIG. 17 is a partial top view of a second substrate according to one embodiment of the present invention.
Figure 18:
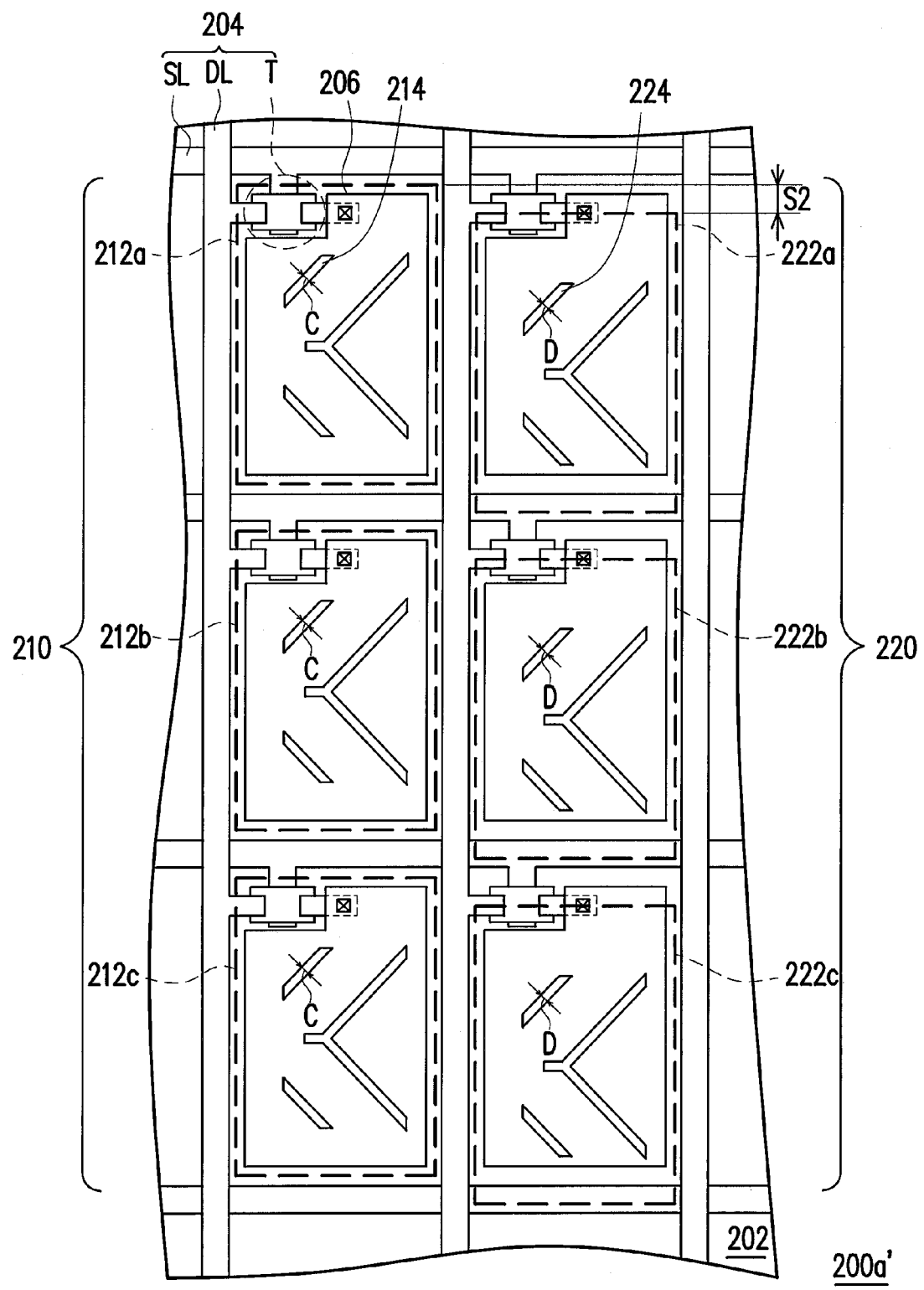
FIG. 18 is a partial top view of a second substrate according to one embodiment of the present invention.
Figure 19:
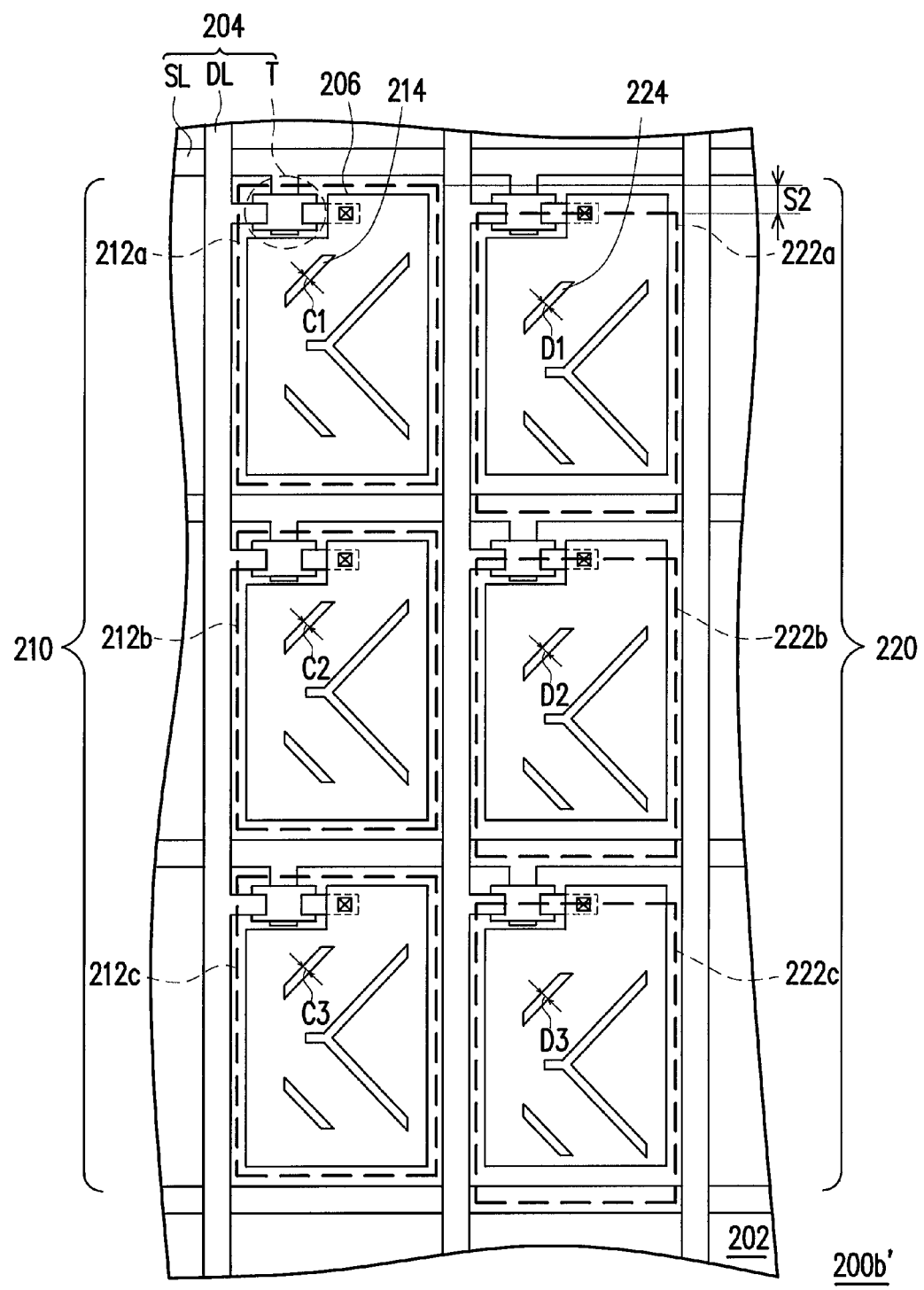
FIG. 19 is a partial top view of a second substrate according to one embodiment of the present invention.
Figure 20:
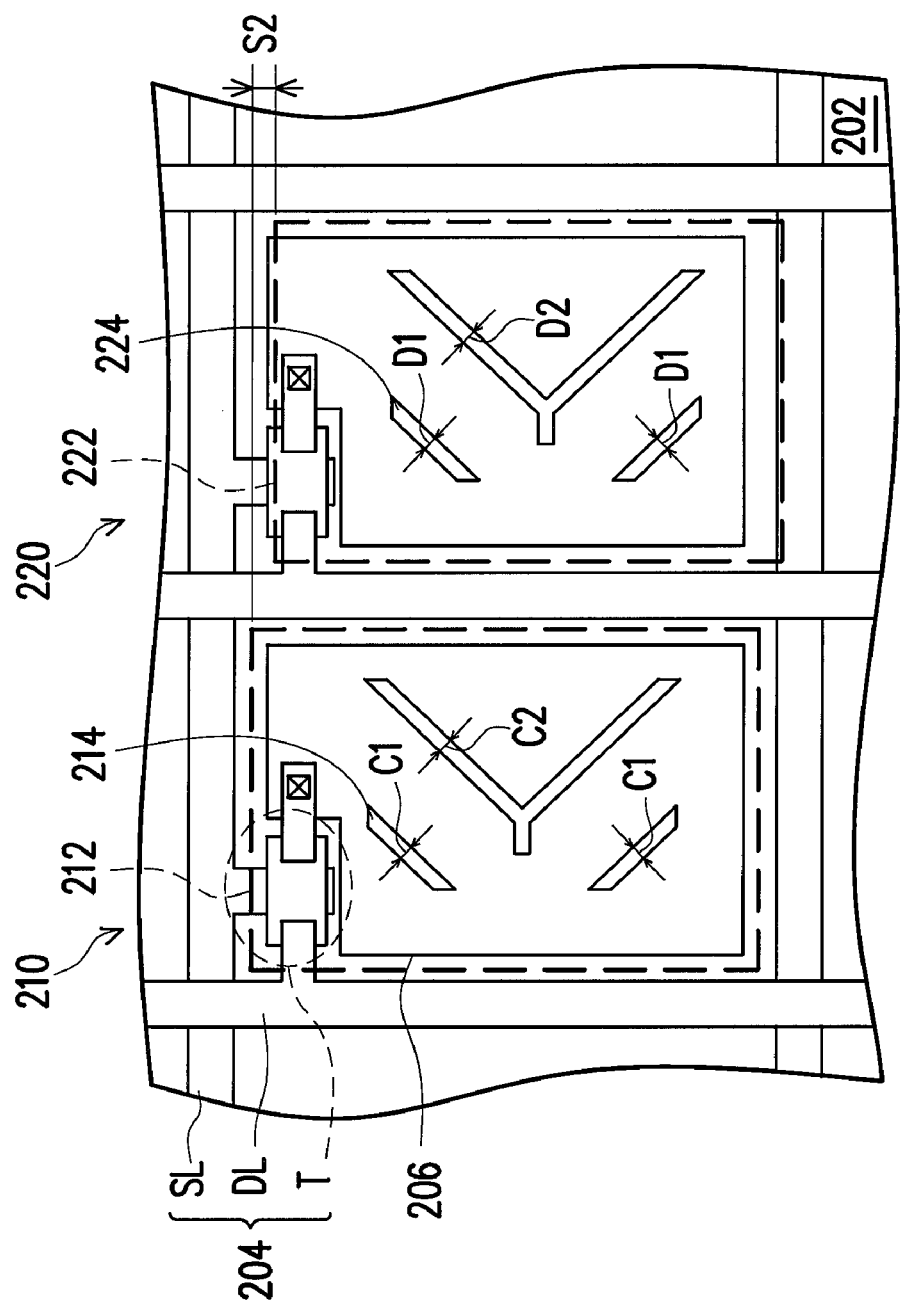
FIG. 20 is a partial top view of a second substrate according to one embodiment of the present invention.

In the second substrate 200d as illustrated in FIG. 8B, the second unit region 210 includes one cell region 212 and the second unit region 220 includes one cell region 222, for example. Further, a plurality of second alignment patterns 214 and 224 are respectively disposed in the cell regions 212 and 222. In this embodiment, the second alignment patterns 214 and 224 have the same width C, for example. Herein, the second unit region 210 has a positional shift S2 relative to the second unit region 220 nearby. Accordingly, the second alignment patterns 214 also have the positional shift S2 relative to the second alignment patterns 224 which are arranged as the first alignment patterns 114. In this embodiment, the positional shift S2 is, for example, between 0.5 and 2 micrometers. It should be noted that the adjacent second unit regions 210 and 220 having the positional shift S2 therebetween is taken as one example in this embodiment, and the present invention is not limited thereto. Referring to FIG. 11, a second substrate 200e includes a plurality of second unit regions 210, 220, and 230. Herein, the second unit region 210 has the positional shift S2 relative to the second unit region 220; the second unit region 220 has a positional shift S2' relative to the second unit region 230; and the second unit region 210 also has a positional shift S2" relative to the second unit region 230. That is, the second unit regions having positional shifts therebetween may be adjacent to each other or separated from each other by at least one cell region. In this embodiment, the positional shifts S2, S2', and S2" are, for example, between 0.5 and 2 micrometers. Furthermore, in the above embodiments, each of the second unit regions 210 and 220, for instance, has one cell region 212 and 222, but the present invention is not limited thereto. Take a second substrate 200f as shown in FIG. 12 as an example, the second unit region 210 comprises a plurality of cell regions 212a, 212b, and 212c, and the second unit region 220 comprises a plurality of cell regions 222a, 222b, and 222c. The second unit region 210 has the positional shift S2 relative to the second unit region 220. In other words, the cell regions 212a, 212b, and 212c all have the positional shift S2 relative to the cell regions 222a, 222b, and 222c.

In this embodiment, the first substrate 100d and the second substrate 200d are assembled to form the liquid crystal display panel. Herein, the liquid crystal molecules in the liquid crystal layer are affected by the first alignment patterns 114 and the second alignment patterns 214 to tilt, so that the liquid crystal display panel has the property of wide viewing angle. It is noted that the first substrate in the liquid crystal display panel of the present invention may be the first substrate 100e in FIG. 9 or the first substrate 100f in FIG. 10. Further, the second substrate may be the second substrate 200e in FIG. 11 or the second substrate 200f in FIG. 12.

In the foregoing embodiments, one unit region in the substrate has a positional shift relative to the unit regions close thereto. In the process of forming alignment patterns with adjoined photomasks, although misalignment between adjacent alignment patterns, which results from low adjoining precision at the junctions of neighboring exposure regions, can not be avoided, the minor positional shifts which already exist between the alignment patterns in different unit regions are contributive to obscuring the aforesaid misalignment, and further to enhance the viewing quality of the liquid crystal display panel.

It should be noted that the aforementioned embodiments are illustrated based on substrates having alignment patterns with different widths or substrates having positional shifts between unit regions. However, the alignment patterns in the unit regions may also be designed to have both of the aforesaid features.

FIGS. 13 to 16 illustrate partial top views of first substrates according to one embodiment of the present invention. Herein, first substrates 100', 100a', 100b', and 100c' are respectively similar to the first substrates 100, 100a, 100b, and 100c in FIGS. 1B, 2, 3, and 4. The difference therebetween lies in that, in the first substrates 100', 100a', 100b', and 100c', the first unit region 112 has the positional shift S1 relative to the first unit region 122, and the positional shift S1 is between 0.5 and 2 micrometers, for example.

FIGS. 17 to 20 illustrate partial top views of second substrates according to one embodiment of the present invention. Herein, second substrates 200', 200a', 200b', and 200c' are respectively similar to the second substrates 200, 200a, 200b, and 200c in FIGS. 1C, 5, 6, and 7. The difference therebetween lies in that, in the second substrates 200', 200a', 200b', and 200c', the second unit region 212 has the positional shift S2 relative to the second unit region 222, and the positional shift S2 is between 0.5 and 2 micrometers, for example.

In the foregoing embodiments, the width of the alignment patterns in one unit region is different from the width of the alignment patterns in the unit region close thereto, and the two unit regions have a positional shift therebetween. Hence, the width difference and the defect of misalignment between adjacent regions are obscured. Accordingly, the viewing quality of the liquid crystal display panel is further enhanced.

In view of the above, the present invention provides various structures of the first substrate and the second substrate. The first substrates 100, 100a~100f, 100', or 100a'~100c' may be assembled with the second substrates 200, 200a~200f, 200', or 200a'~200c' to form the liquid crystal display panel. Otherwise, the first substrates 100, 100a~100f, 100', or 100a'~100c' and the second substrates 200, 200a~200f, 200', or 200a'~200c' may also be respectively combined with a conventional substrate to form a liquid crystal display panel for achieving better viewing quality.

To conclude, in the substrate of the liquid crystal display panel according to the present invention, the alignment patterns in different unit regions may have different widths, and the unit regions may have a positional shift therebetween. When adjoined photomasks are used to perform an exposure process for fabricating liquid crystal display panel, although the defects of width difference or misalignment between adjacent patterns, which result from discrepant exposures or low adjoining precision at the junctions of neighboring exposure regions, can not be avoided, the minor differences in width or position which already exist between the alignment patterns are contributive to obscuring the foregoing defects, and further to enhance the viewing quality of the liquid crystal display panel.

Although the present invention has been disclosed by the above embodiments, they are not intended to limit the present invention. Persons having ordinary knowledge in the art may make some modifications and variations without departing from the spirit and scope of the present invention. Therefore, the protection range of the present invention falls in the appended claims.

What is claimed is:

1. A liquid crystal display panel, comprising:
   a first substrate comprising a plurality of first unit regions, each of the first unit regions comprising at least a pixel region, and a plurality of first alignment patterns being disposed in each of the pixel regions, wherein at least one first unit region has a first positional shift relative to other first unit regions close to the at least one first unit region;
   a second substrate disposed opposite to the first substrate; and
   a liquid crystal layer disposed between the first substrate and the second substrate.

2. The liquid crystal display panel as claimed in claim 1, wherein the at least one first unit region is adjacent to the other first unit regions close to the at least one first unit region.

3. The liquid crystal display panel as claimed in claim 1, wherein the at least one first unit region is separated from the other first unit regions close to the at least one first unit region by at least one pixel region.

4. The liquid crystal display panel as claimed in claim 1, wherein the first positional shift is between 0.5 and 2 micrometers.

5. The liquid crystal display panel as claimed in claim 1, wherein a width of the first alignment patterns in the at least one first unit region is different from a width of the first alignment patterns in the other first unit regions close to the at least one first unit region.

6. The liquid crystal display panel as claimed in claim 5, wherein, in each of the pixel regions, a width of a portion of the first alignment patterns is different from a width of another portion of the first alignment patterns.

7. The liquid crystal display panel as claimed in claim 5, wherein a width difference between the first alignment patterns with different widths is between 0.3 and 1 micrometer.

8. The liquid crystal display panel as claimed in claim 1, wherein the second substrate comprises a plurality of second unit regions, and each of the second unit regions comprises at least a cell region, wherein each of the cell regions is disposed corresponding to one pixel region and has a plurality of second alignment patterns disposed therein.

9. The liquid crystal display panel as claimed in claim 8, wherein at least one second unit region has a second positional shift relative to other second unit regions close to the at least one second unit region.

10. The liquid crystal display panel as claimed in claim 9, wherein the at least one second unit region is adjacent to the other second unit regions close to the at least one second unit region.

11. The liquid crystal display panel as claimed in claim 9, wherein the at least one second unit region is separated from the other second unit regions close to the at least one second unit region by at least one cell region.

12. The liquid crystal display panel as claimed in claim 9, wherein the second positional shift is between 0.5 and 2 micrometers.

13. The liquid crystal display panel as claimed in claim 8, wherein a width of the second alignment patterns in the at least one second unit region is different from a width of the second alignment patterns in the other second unit regions close to the at least one second unit region.

14. The liquid crystal display panel as claimed in claim 13, wherein the at least one second unit region is adjacent to the other second unit regions close to the at least one second unit region.

15. The liquid crystal display panel as claimed in claim 13, wherein, in each of the cell regions, a width of a portion of the second alignment patterns is different from a width of another portion of the second alignment patterns.

\* \* \* \* \*